US009429796B2

(12) United States Patent
Lee et al.

(10) Patent No.: US 9,429,796 B2
(45) Date of Patent: Aug. 30, 2016

(54) LIQUID CRYSTAL DISPLAY AND METHOD OF MANUFACTURING THE SAME

(71) Applicant: Samsung Display Co., Ltd., Yongin-si, Gyeonggi-do (KR)

(72) Inventors: Hyoung Sub Lee, Yongin (KR); Tae Gyun Kim, Yongin (KR); Woo Yong Sung, Yongin (KR); Nak Cho Choi, Yongin (KR); Sang Gun Choi, Yongin (KR); Si Kwang Kim, Yongin (KR); Tae Woon Cha, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 113 days.

(21) Appl. No.: 14/198,931

(22) Filed: Mar. 6, 2014

(65) Prior Publication Data
US 2015/0092130 A1 Apr. 2, 2015

(30) Foreign Application Priority Data

Sep. 27, 2013 (KR) .................. 10-2013-0115351

(51) Int. Cl.
*G02F 1/1341* (2006.01)
*G02F 1/1333* (2006.01)

(52) U.S. Cl.
CPC ....... *G02F 1/1341* (2013.01); *G02F 1/133377* (2013.01)

(58) Field of Classification Search
CPC .................................................. G02F 1/1334
See application file for complete search history.

(56) References Cited

U.S. PATENT DOCUMENTS

| 5,946,070 | A | 8/1999 | Kohama et al. |
| 2006/0209246 | A1* | 9/2006 | Kim .................. G02F 1/133377 349/155 |
| 2007/0177072 | A1* | 8/2007 | Chang ............... G02F 1/136213 349/110 |
| 2012/0062448 | A1* | 3/2012 | Kim .................. G02F 1/133377 345/55 |
| 2013/0057819 | A1* | 3/2013 | Kurosaki ............. G02F 1/1341 349/154 |

FOREIGN PATENT DOCUMENTS

| JP | 07-248504 | 9/1995 |
| JP | 07-318955 | 12/1995 |
| JP | 10-048648 | 2/1998 |
| JP | 2006-201547 | 8/2006 |
| JP | 2008-242150 | 10/2008 |
| KR | 10-2004-0011671 | 2/2004 |
| KR | 10-0688958 | 2/2007 |

* cited by examiner

*Primary Examiner* — Paisley L Arendt
*Assistant Examiner* — Edmond Lau
(74) *Attorney, Agent, or Firm* — Knobbe Martens Olson & Bear LLP

(57) ABSTRACT

A liquid crystal display includes: a substrate; a thin film transistor comprising one or more terminals and disposed on the substrate; a pixel electrode connected to one of the terminals of the thin film transistor; and a roof layer disposed to face the pixel electrode, wherein a microcavity is formed between the pixel electrode and the roof layer, the microcavity including a liquid crystal material, wherein a plurality of microcavities are disposed along a first row and a second row adjacent to each other, a trench is formed between the first row and the second row, and at least one bridge connecting the first row and the second row is disposed at the trench.

19 Claims, 28 Drawing Sheets

LIQUID CRYSTAL DISPLAY AND METHOD OF MANUFACTURING THE SAME

CROSS-REFERENCE TO RELATED APPLICATION

This application claims priority to, and the benefit of, Korean Patent Application No. 10-2013-0115351 filed in the Korean Intellectual Property Office on Sep. 27, 2013, the entire contents of which are incorporated herein by reference in their entirety.

BACKGROUND

1. Field

The present disclosure relates to a liquid crystal display and a manufacturing method thereof.

2. Description of the Related Technology

A liquid crystal display, one of flat panel display devices that are being widely used, includes two display panels, where field generating electrodes such as a pixel electrode and a common electrode are formed with a liquid crystal layer interposed therebetween.

The liquid crystal display generates an electric field in the liquid crystal layer by applying a voltage to the field generating electrodes to determine orientations of liquid crystal molecules of the liquid crystal layer and control polarization of incident light, thereby displaying an image.

A technology for forming a cavity in a unit of a pixel and filling the cavity with liquid crystals to implement a display has been developed as one of the liquid crystal displays. This technology includes manufacturing a display by forming a sacrificial layer with an organic material, and the like, forming a supporting member on the sacrificial layer, removing the sacrificial layer, and filling an empty space formed through the removal of the sacrificial layer with liquid crystals through a liquid crystal injection hole, instead of forming an upper panel on a lower panel.

In a larger-sized liquid crystal display, when filling the liquid crystals in each cavity, the liquid crystals may be not filled in a given region in the cavity.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present disclosure provides a liquid crystal display in which a non-filled region of a liquid crystal is reduced, and a manufacturing method thereof A liquid crystal display according to an embodiment includes: a substrate; a thin film transistor comprising one or more terminals and disposed on the substrate; a pixel electrode connected to one of the terminals of the thin film transistor; and a roof layer disposed to face the pixel electrode, wherein a microcavity is formed between the pixel electrode and the roof layer, the microcavity including a liquid crystal material, wherein a plurality of microcavities are disposed along a first row and a second row adjacent to each other, a trench is formed between the first row and the second row, and at least one bridge connecting the first row and the second row is disposed at the trench.

The trench may include a first region having a first cross-section and a second region having a second cross-section, the first cross-section being smaller than the second cross-section, and the first region corresponding to a portion in which the at least one bridge is disposed.

The at least one bridge may be disposed at a same layer as the roof layer.

The at least one bridge may comprise a same material as the roof layer.

A common electrode and a lower insulating layer both disposed between the microcavity and the roof layer may be further included, the lower insulating layer may be disposed on the common electrode, and the common electrode and the lower insulating layer may be extended to be disposed under the bridge.

A capping layer disposed on the roof layer may be further included, and the capping layer may fill the trench.

A light blocking member disposed on the substrate may be further included, the light blocking member may include a first light blocking member extending in the same direction as a gate line connected to the thin film transistor, and a second light blocking member extending in the same direction as a data line connected to the thin film transistor, wherein the at least one bridge may extend in the same direction as the second light blocking member and may overlap the second light blocking member.

The at least one bridge may be disposed at a same layer as the microcavity.

An insulating layer disposed between the thin film transistor and the pixel electrode may be further included, the insulating layer may include a convex part, and the convex part may form the at least one bridge.

A common electrode and a lower insulating layer disposed between the microcavity and the roof layer may be further included, wherein the lower insulating layer may be disposed on the common electrode.

A capping layer disposed on the roof layer may be further included, and the capping layer may fill the trench.

A manufacturing method of a liquid crystal display according to an embodiment includes: forming a thin film transistor comprising one or more terminals on a substrate; forming a pixel electrode connected to one of the terminals of the thin film transistor; forming a sacrificial layer on the pixel electrode; forming a roof layer on the sacrificial layer; patterning a lower insulating layer and a common electrode by using the roof layer as a mask; patterning the roof layer to form a trench; removing the sacrificial layer to form a plurality of microcavities having a liquid crystal injection hole; injecting a liquid crystal material into the plurality of microcavities; and forming a capping layer covering the liquid crystal injection hole on the roof layer, wherein the plurality of microcavities is disposed along a first row and a second row adjacent to each other, wherein a trench is formed between the first row and the second row, and wherein at least one bridge connecting the first row and the second row is disposed at the trench.

The trench may include a first region having a first cross-section and a second region having a second cross-section, wherein the first cross-section is smaller than the second cross-section, and wherein the first region may correspond to a portion in which the at least one bridge is disposed.

In the patterning of the roof layer, the roof layer may be configured to remain in a portion in which the at least one bridge is formed.

The at least one bridge may comprise a same material as the roof layer.

The method may further include injecting an alignment material into the plurality of microcavities, drying the alignment material, wherein a solid remains after the alignment material is dried and formed under the at least one bridge.

The method may further include forming a light blocking member on the substrate, the light blocking member may include a first light blocking member extending in the same direction as a gate line connected to the thin film transistor and a second light blocking member extending in the same direction as a data line connected to the thin film transistor, wherein the at least one bridge may extend in the same direction as the second light blocking member while overlapping the second light blocking member.

The method may further include forming an insulating layer between the thin film transistor and the pixel electrode, wherein the insulating layer may include a convex part, and the convex part forms the at least one bridge.

The method may further include forming a light blocking member on the substrate, wherein an upper surface of the light blocking member may be protruded corresponding to a portion in which the at least one bridge is disposed.

The method may further include forming a common electrode and a lower insulating layer disposed between the plurality of microcavities and the roof layer, wherein the lower insulating layer may be formed to be disposed on the common electrode.

According to an embodiment, the bridge is formed in the trench such that the liquid crystal being insufficiently filled in an arbitrary microcavity may be prevented.

DETAILED DESCRIPTION OF CERTAIN INVENTIVE EMBODIMENTS

Figure 1:
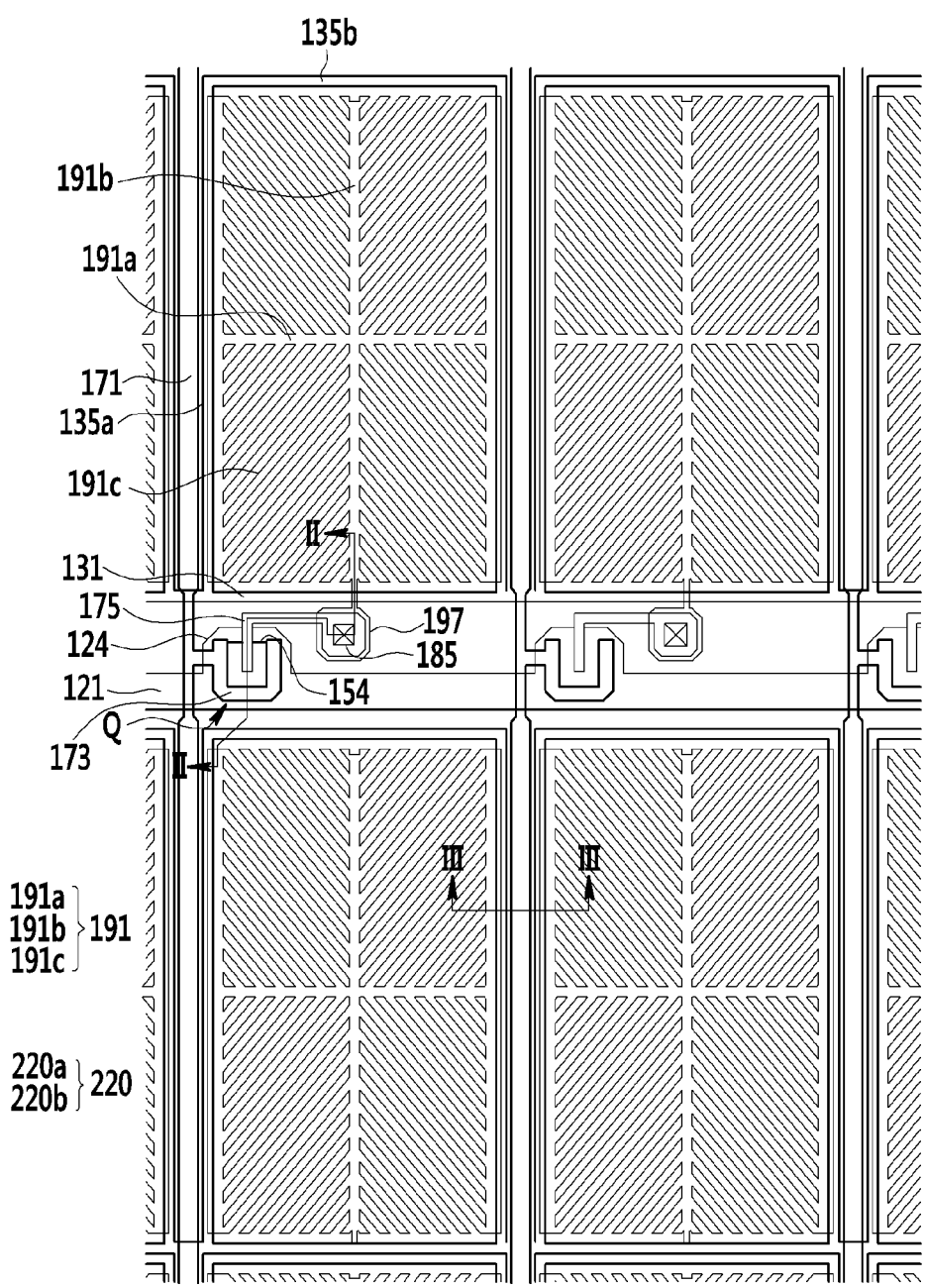
FIG. 1 is a top plan view of a liquid crystal display according to an embodiment.

Hereinafter, certain embodiments of the present invention will be described in detail with reference to the accompanying drawings. As those skilled in the art would realize, the described embodiments may be modified in various ways, without departing from the spirit or scope of the present invention. On the contrary, embodiments introduced herein are provided to make disclosed contents thorough and complete, and sufficiently transfer the spirit of the present invention to those skilled in the art.

In the drawings, the thickness of layers, films, panels, regions, etc., may be exaggerated for clarity. It will be understood that when a layer is referred to as being "on" another layer or substrate, it can be directly on the other layer or substrate, or intervening elements may also be present. Like reference numerals generally designate like elements throughout the specification.

Figure 2:
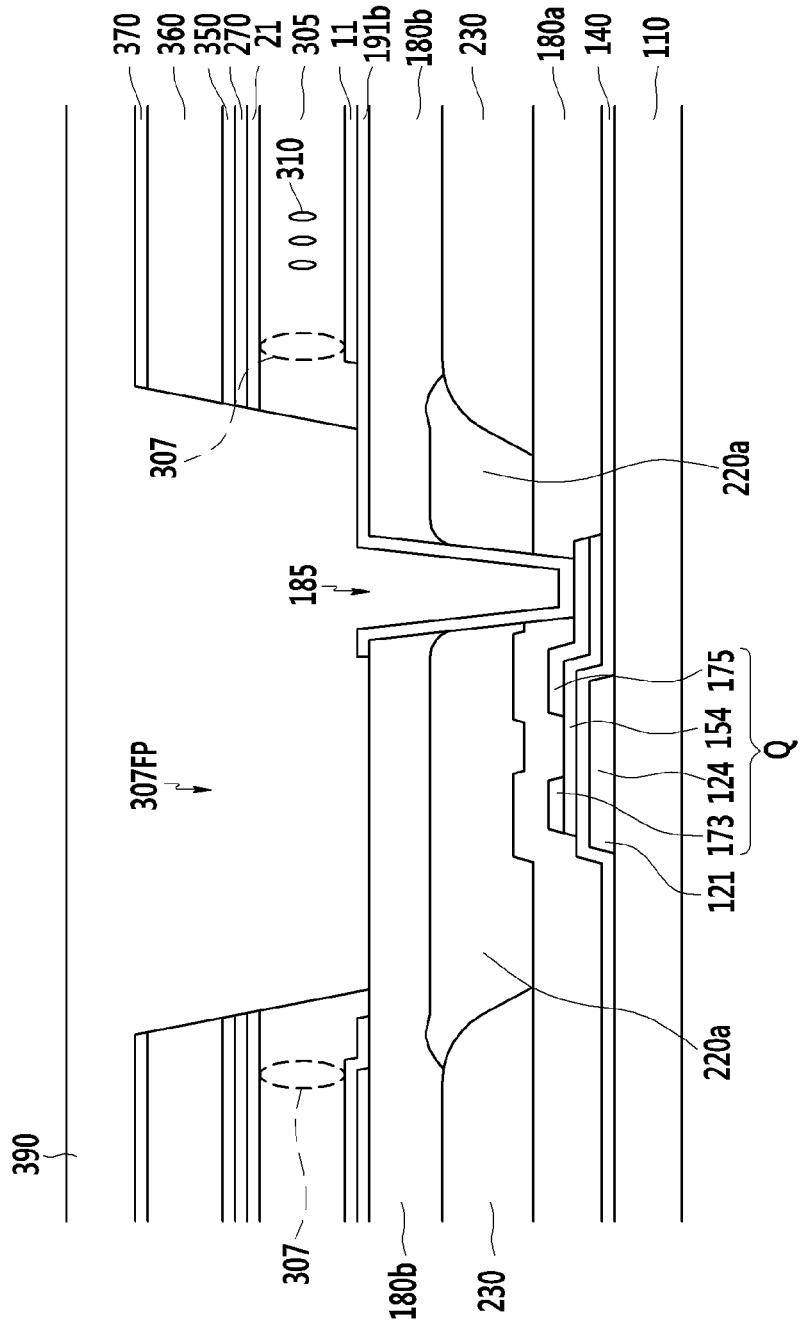
FIG. 2 is a cross-sectional view taken along the line II-II of FIG. 1.
Figure 3:
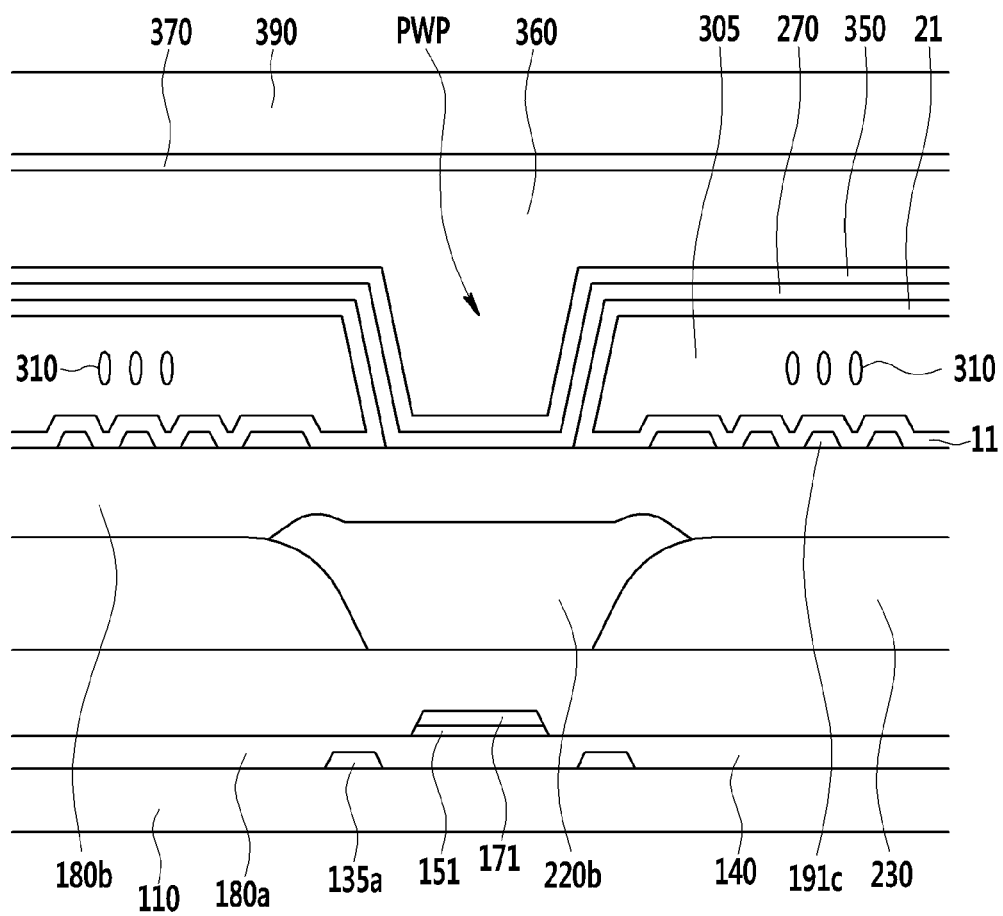
FIG. 3 is a cross-sectional view taken along the line of FIG. 1.

FIG. 1 is a top plan view of a liquid crystal display according to an embodiment. FIG. 2 is a cross-sectional view taken along the line II-II of FIG. 1. FIG. 3 is a cross-sectional view taken along the line III-III of FIG. 1.

Referring to FIG. 1 to FIG. 3, a gate line 121 and a storage electrode line 131 are formed on a substrate 110 made of transparent glass or plastic. The gate line 121 includes a gate electrode 124. The storage electrode line 131 is mainly extended in a horizontal direction, and transfers a predetermined voltage, such as a common voltage Vcom. The storage electrode line 131 includes a pair of vertical storage electrode portions 135a substantially extended to be perpendicular to the gate line 121, and a horizontal storage electrode portion 135b connecting ends of the pair of vertical portions 135a to each other. The storage electrode portions 135a and 135b have a structure surrounding the pixel electrode 191.

A gate insulating layer 140 is formed on the gate line 121 and the storage electrode line 131. A semiconductor layer 151 disposed under a data line 171, and a semiconductor layer 154 disposed under a source/drain electrode and at a channel portion of a thin film transistor Q, are formed on the gate insulating layer 140.

A plurality of ohmic contacts may be formed on each of the semiconductor layers 151 and 154, and between the data line 171 and the source/drain electrode, but they are omitted in the drawings.

Data conductors 171, 173, and 175 including a source electrode 173, a data line 171 connected with the source electrode 173, and a drain electrode 175 are formed on each of the semiconductor layers 151 and 154 and the gate insulating layer 140.

The gate electrode 124, the source electrode 173, and the drain electrode 175 form a thin film transistor Q together with the semiconductor layer 154, and a channel of the thin film transistor Q is formed on a portion of the semiconductor layer 154 between the source electrode 173 and the drain electrode 175.

A first interlayer insulating layer 180a is formed on the data conductors 171, 173, and 175 and an exposed portion of the semiconductor layer 154. The first interlayer insulating layer 180a may include an inorganic insulating material, such as, for example, a silicon nitride (SiNx) and a silicon oxide (SiOx), or an organic insulating material.

A color filter 230 and a light blocking member 220 are formed on the first interlayer insulating layer 180a.

The light blocking member 220 has a lattice structure having an opening corresponding to a region for displaying an image, and is formed of a material that prevents light from being transmitted. The color filter 230 is formed at the opening of the light blocking member 220. The light blocking member 220 includes a first light blocking member 220a formed in a direction parallel to the gate line 121 and a second light blocking member 220b formed in a direction parallel to the data line 171.

The color filter 230 may display one of primary colors, such as, for example, three primary colors including red, green, and blue. However, the colors are not limited to the three primary colors including red, green, and blue, and the color filter 230 may also display one among a cyan-based color, a magenta-based color, a yellow-based color, and a white-based color. The color filter 230 may be formed of a material displaying different colors for each adjacent pixel.

A second interlayer insulating layer 180b covering the color filter 230 and the light blocking member 220 is formed on the color filter 230 and the light blocking member 220. The second interlayer insulating layer 180b may include an inorganic insulating material, such as, for example, a silicon nitride (SiNx) and a silicon oxide (SiOx), or an organic insulating material. Contrary to the illustration in the cross-sectional view of FIG. 2, in a case where a step is generated due to a difference in thickness between the color filter 230 and the light blocking member 220, the second interlayer insulating layer 180b includes an organic insulating material, so that it is possible to decrease or eliminate the step.

The color filter 230, the light blocking member 220, and the interlayer insulating layers 180a and 180b have a contact hole 185 exposing the drain electrode 175.

A pixel electrode 191 is disposed on the second interlayer insulating layer 180b. The pixel electrode 191 may be formed of a transparent conductive material, such as ITO or IZO.

An entire shape of the pixel electrode 191 is a quadrangle, and includes a cross-shaped stem portion including a transverse stem portion 191a and a longitudinal stem portion 191b crossing the transverse stem portion 191a. Further, the pixel electrode 191 has four sub-regions because of the transverse stem 191a and the longitudinal stem 191b, and each of the sub-regions includes a plurality of fine branches 191c. In one embodiment, the pixel electrode 191 further includes an outer stem enclosing the outer portion.

The fine branch portions 191c of the pixel electrode 191 form an angle of about 40 degrees to about 45 degrees with the gate line 121 or the transverse stem 191a. Further, the minute branches of two adjacent subregions may be perpendicular to each other. In addition, a width of the fine branch 191c may become gradually larger or intervals between the fine branches 191c may be different from each other.

The pixel electrode 191 includes an extended portion 197 connected at a lower end of the longitudinal stem 191b and having a wider area than that of the longitudinal stem 191b, and is physically and electrically connected with the drain electrode 175 through the contact hole 185 at the extended portion 197, and receives a data voltage from the drain electrode 175.

The description of the aforementioned thin film transistor Q and pixel electrode 191 is one example, and a structure of the thin film transistor and a design of the pixel electrode may be modified in order to improve side visibility.

A lower alignment layer 11 is formed on the pixel electrode 191, and the lower alignment layer 11 may be a vertical alignment layer. The lower alignment layer 11, which is a liquid crystal alignment layer, may be formed of any one among generally used materials such as, for example, polyamic acid, polysiloxane, or a polyimide.

An upper alignment layer 21 is disposed at a portion facing the lower alignment layer 11, and a microcavity 305 is formed between the lower alignment layer 11 and the upper alignment layer 21. A liquid crystal material including liquid crystal molecules 310 is injected into the microcavity 305 through a liquid crystal injection hole 307. The microcavity 305 may be formed along a column direction of the pixel electrode 191, or, a vertical direction. In one embodiment, an alignment material forming the alignment layers 11 and 21 and the liquid crystal material including the liquid crystal molecules 310 may be injected into the microcavity 305 by using capillary force. It may be described that the microcavity 305 is a space of the pixel electrode 191 and a common electrode 270, and the alignment layers 11 and 21 are formed in the microcavity 305.

The microcavity 305 is divided in a vertical direction by a plurality of trenches 307FP disposed at a portion overlapping the gate line 121, and a plurality of microcavities 305 may be formed along the direction in which the gate line 121 is extended. Each of the plurality of formed microcavities 305 may correspond to a pixel area, and the pixel areas may correspond to a region displaying an image.

The common electrode 270 and a lower insulating layer 350 are disposed on the upper alignment layer 21. The common electrode 270 receives the common voltage, and generates an electric field together with the pixel electrode 191 to which the data voltage is applied to determine a direction in which the liquid crystal molecules 310 disposed at the microcavity 305 between the two electrodes are inclined. The common electrode 270 forms a capacitor with the pixel electrode 191 to maintain the received voltage even after the thin film transistor is turned off. The lower insulating layer 350 may be formed of a silicon nitride (SiNx) or a silicon oxide (SiOx).

In one embodiment, it is described that the common electrode 270 is formed on the microcavity 305, but in another embodiment, the common electrode 270 is formed under the microcavity 305, so that liquid crystal driving according to a coplanar electrode (CE) mode is possible.

A roof layer 360 is disposed on the lower insulating layer 350. The roof layer 360 serves to make a support so that the microcavity 305, which is a space between the pixel electrode 191 and the common electrode 270, is formed. The roof layer 360 may include a photoresist or other organic materials.

The roof layer 360 according to one embodiment will be described in detail with reference to FIG. 4 to FIG. 6.

Figure 4:
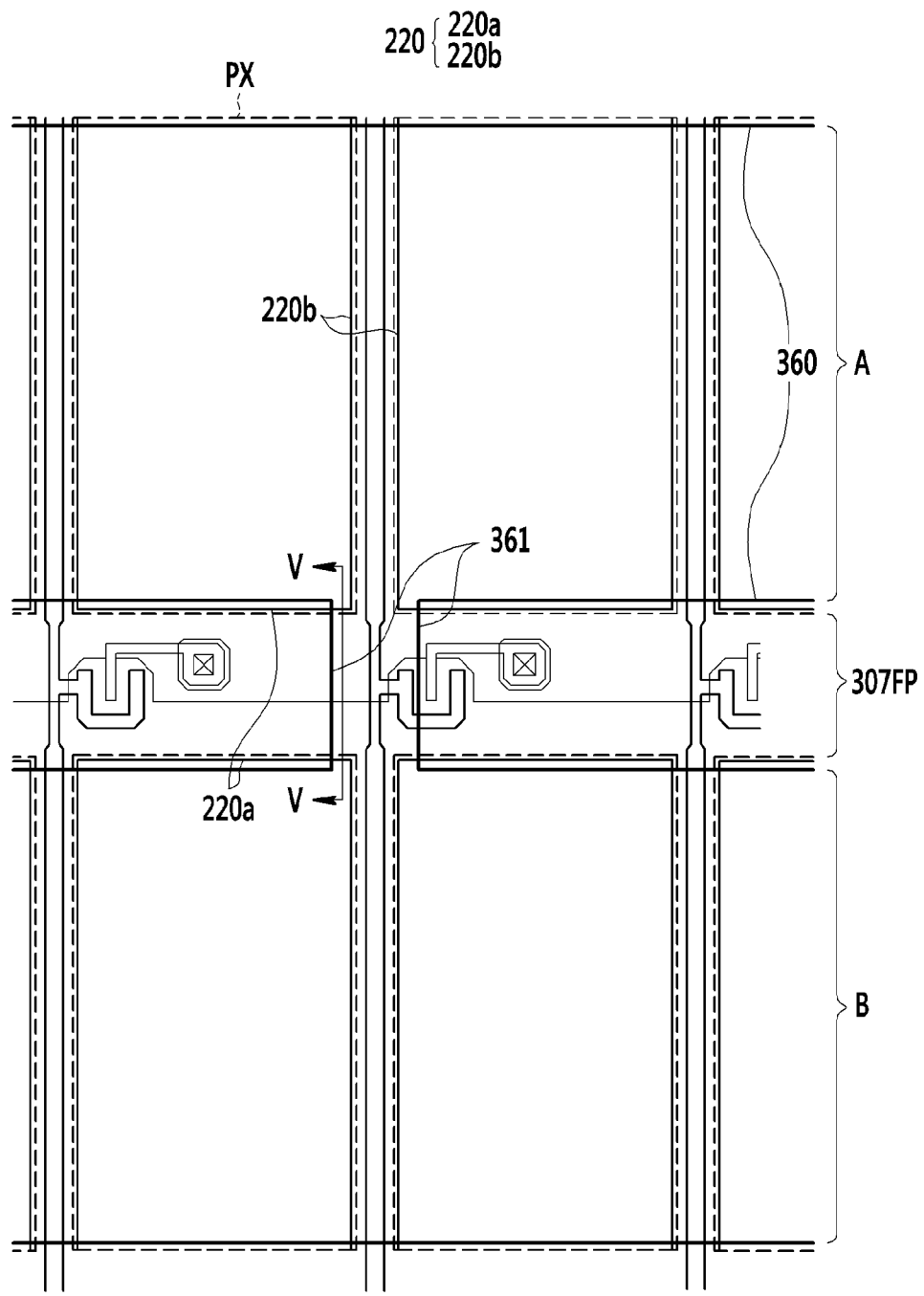
FIG. 4 is a top plan view of a portion where a roof layer is disposed in FIG. 1.

FIG. 4 is a top plan view of a portion where a roof layer is disposed in FIG. 1. FIG. 5 is a cross-sectional view taken along the line V-V of FIG. 4. FIG. 6 is a perspective view of a bridge according to an embodiment in FIG. 4 and FIG. 5.

Figure 5:
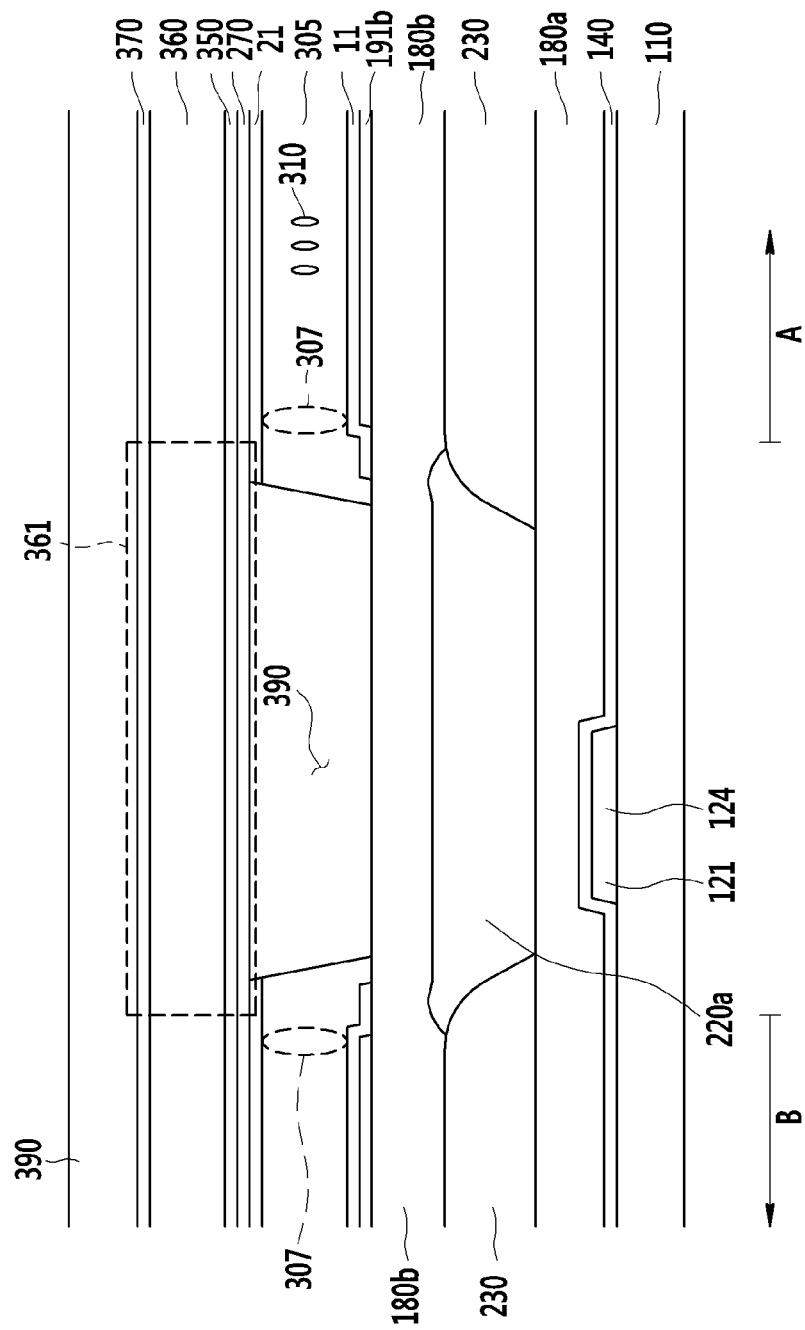
FIG. 5 is a cross-sectional view taken along the line V-V of FIG. 4.

Referring to FIG. 4 and FIG. 5, in one embodiment, a plurality of microcavities 305 are disposed according to a first row A and a second row B, and the trench 307FP is formed between the first row A and the second row B. In one embodiment, at least one bridge 361 connecting the first row A and the second row B is disposed at the trench 307FP. The roof layer 360 is elongated according to the first row A and the second row B, and is formed to connect the first row A and the second row B thereby forming the bridge 361. At this time, the bridge 361 may be formed with the same material as the roof layer 360 and may be disposed at a same layer as the roof layer 360.

Figure 6:
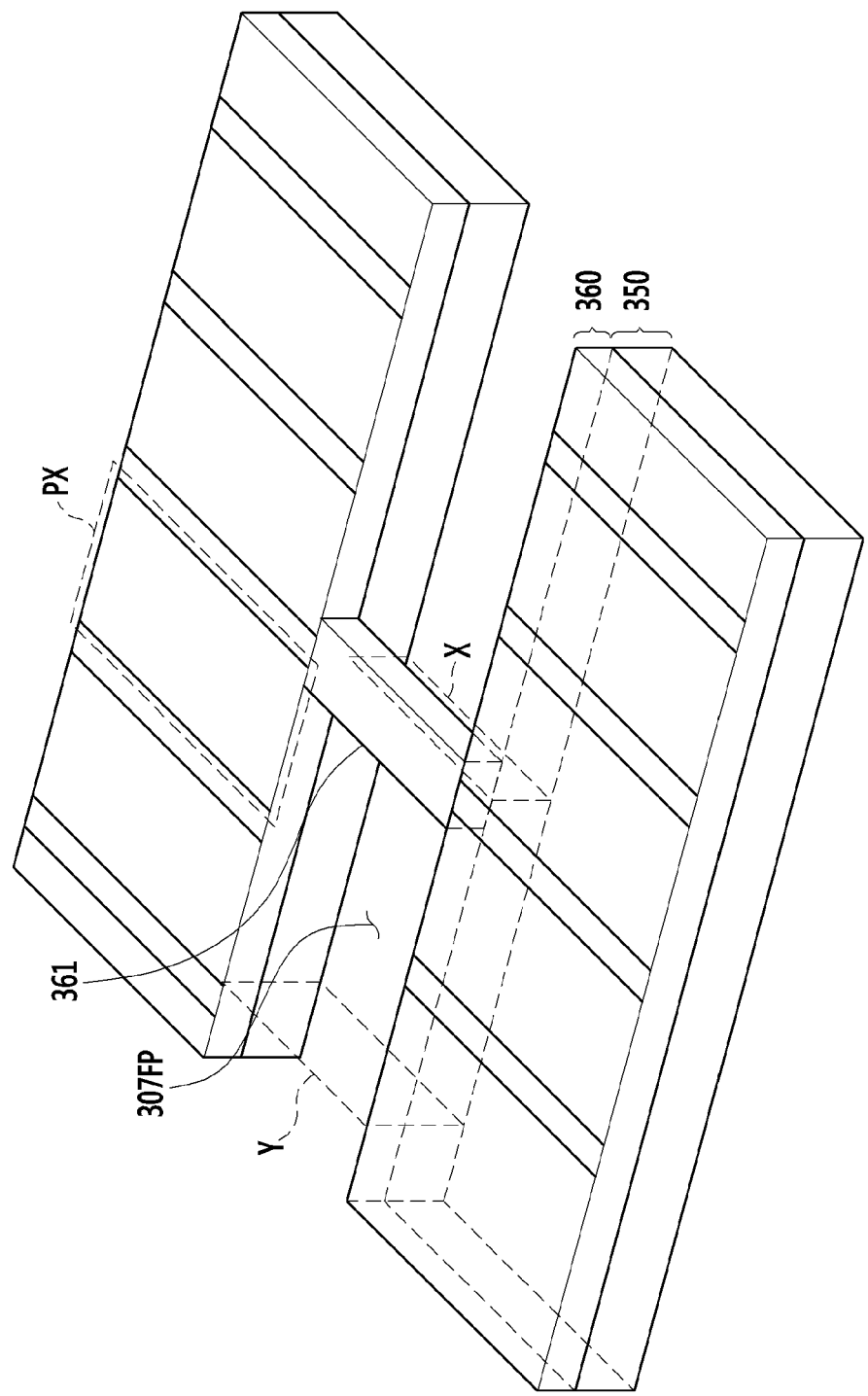
FIG. 6 is a perspective view of a bridge according to an embodiment in FIG. 4 and FIG. 5.

Referring to FIG. 6, a first region X of the trench 307FP corresponding to the portion where the bridge 361 is disposed has a first cross-section, and a second region Y of the trench 307FP except for the first region X has a second cross-section. The first cross-section is smaller than the second cross-section.

As shown in FIG. 5, the common electrode 270 and the lower insulating layer 350 disposed between the microcavity 305 and the roof layer 360 are extended, and may be disposed under the roof layer 360 forming the bridge 361.

In one embodiment, the bridge 361 may extend in the same direction as the second light blocking member 220b while overlapping the second light blocking member 220b.

However, this structure is not limited, and the bridge 361 may be formed with an oblique shape.

Referring to FIG. 2, FIG. 3, and FIG. 5, an upper insulating layer 370 is disposed on the roof layer 360. The upper insulating layer 370 may contact an upper surface of the roof layer 360. The upper insulating layer 370 may be formed of, for example, a silicon nitride (SiNx) or a silicon oxide (SiOx).

A capping layer 390 is disposed on the upper insulating layer 370. The capping layer 390 covers a liquid crystal injection hole 307 of the microcavity 305 exposed by the trench 307FP while filling the trench 307FP. The capping layer 390 may be made of, for example, a thermosetting resin, silicon oxycarbide (SiOC), or graphene. As shown in FIG. 5, the capping layer 390 may fill the lower end of the bridge 361.

An overcoat layer (not illustrated) formed of an inorganic or organic material may be disposed on the capping layer 390. The overcoat layer serves to protect the liquid crystal molecules 310 injected into the microcavity 305 from an external impact, and to planarize the layer.

In one embodiment, a partition wall forming portion (PWP) is formed between the microcavity 305 adjacent in the horizontal direction, as shown in FIG. 3. The partition wall forming portion (PWP) may be formed according to the extending direction of the data line 171, and may be covered by the roof layer 360. The partition wall forming portion PWP is filled with the lower insulating layer 350, the common electrode 270, the upper insulating layer 370, and the roof layer 360, and the structure forms a partition wall so that the microcavity 305 may be divided or defined.

A polarizer (not shown) is disposed on the lower and upper insulating layers 350 and 370 of the substrate 110. The polarizer may include, for example, a polarizing element generating polarized light and a tri-acetyl-cellulose (TAC) layer for securing durability, and in various embodiments, directions of transmissive axes of an upper polarizer and a lower polarizer may be perpendicular or parallel to each other.

Figure 7:
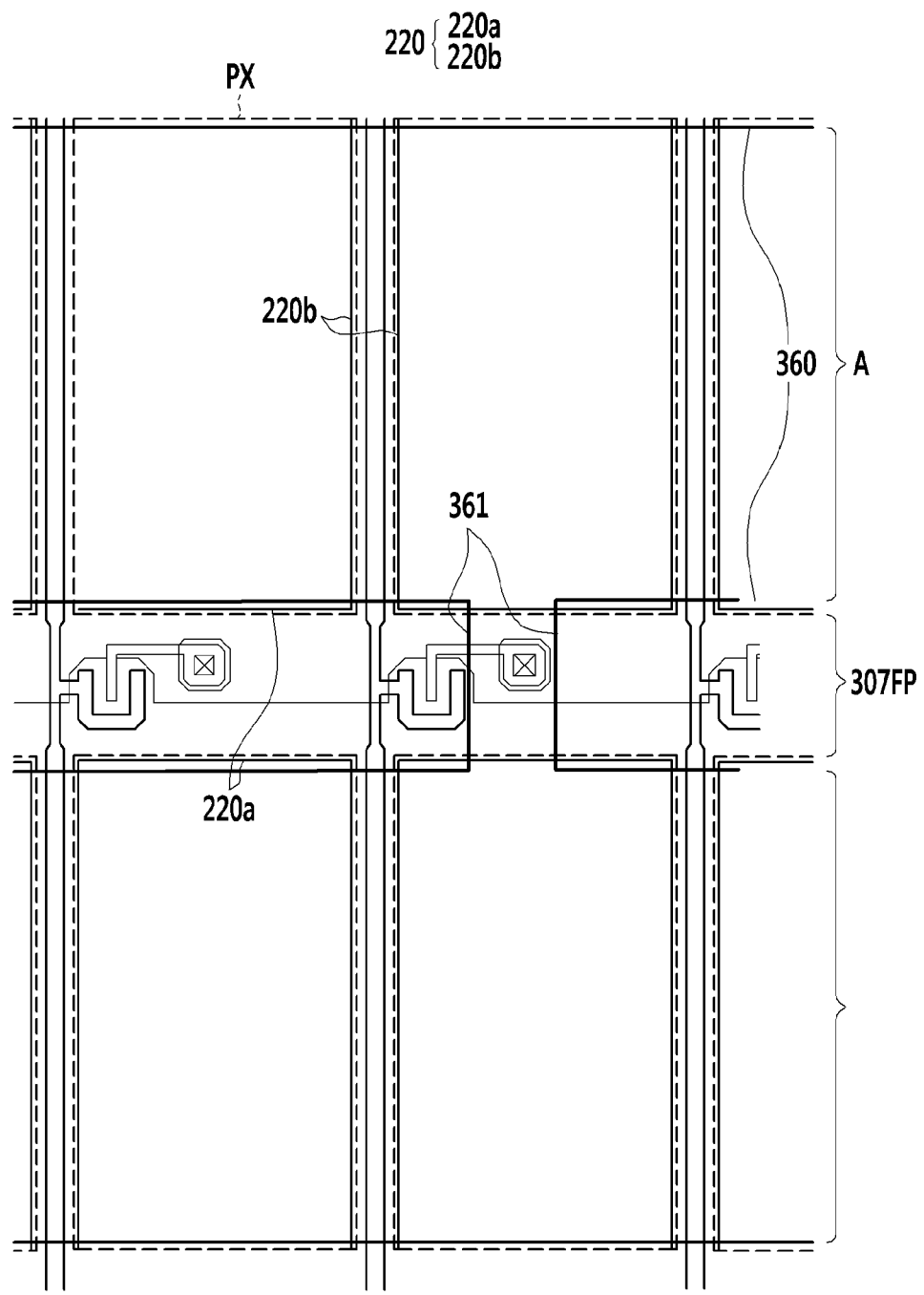
FIG. 7 is a top plan view of a liquid crystal display according to a variation of the embodiment of FIG. 4.

FIG. 7 is a top plan view of a liquid crystal display according to a variation of the embodiment of FIG. 4.

The embodiment of FIG. 7 is mostly the same as the embodiment of FIG. 4, except for the formation position of the bridge 361. Referring to FIG. 7, the bridge 361 is disposed between the microcavity 305 of the first row A and the second row B. Except for this difference, the complete description of the embodiment of FIG. 4 may be applied to embodiment of FIG. 7.

Figure 8:
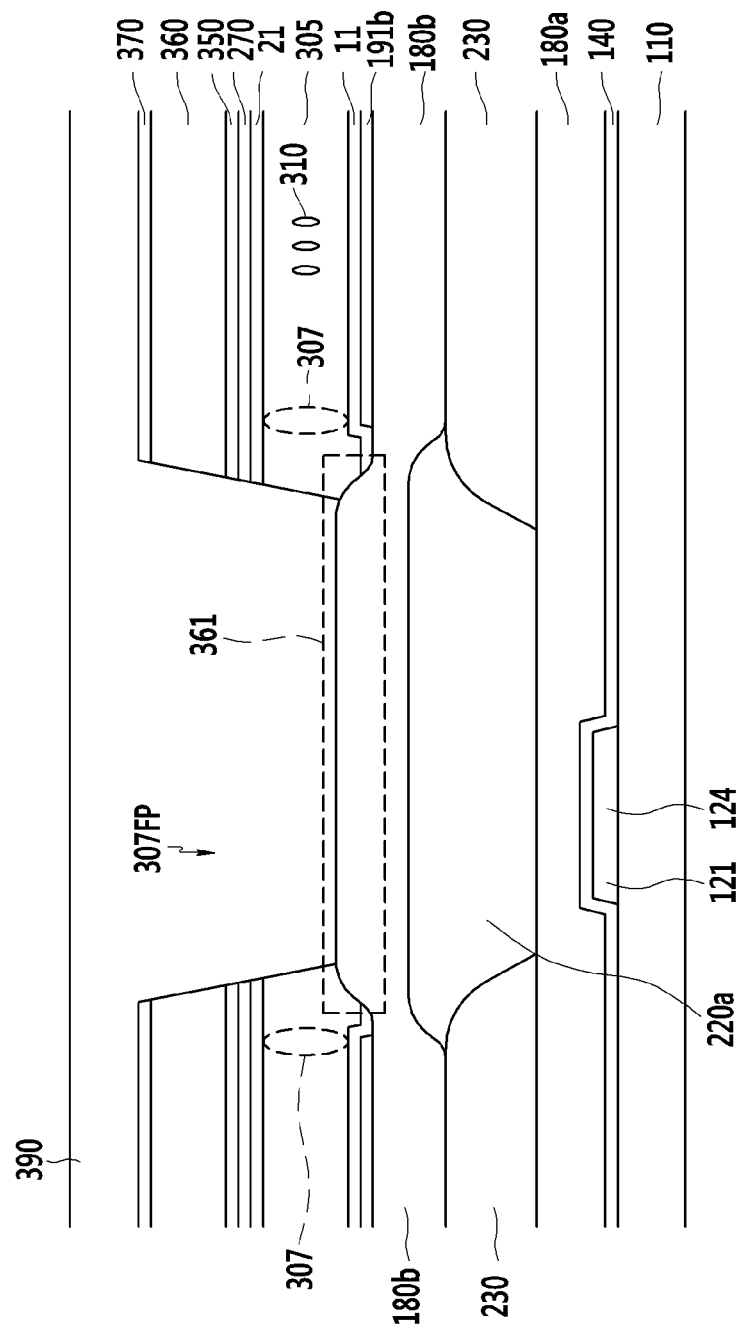
FIG. 8 is a cross-sectional view of a liquid crystal display according to a variation of the embodiment of FIG. 5 taken along the line V-V of FIG. 4.
Figure 9:
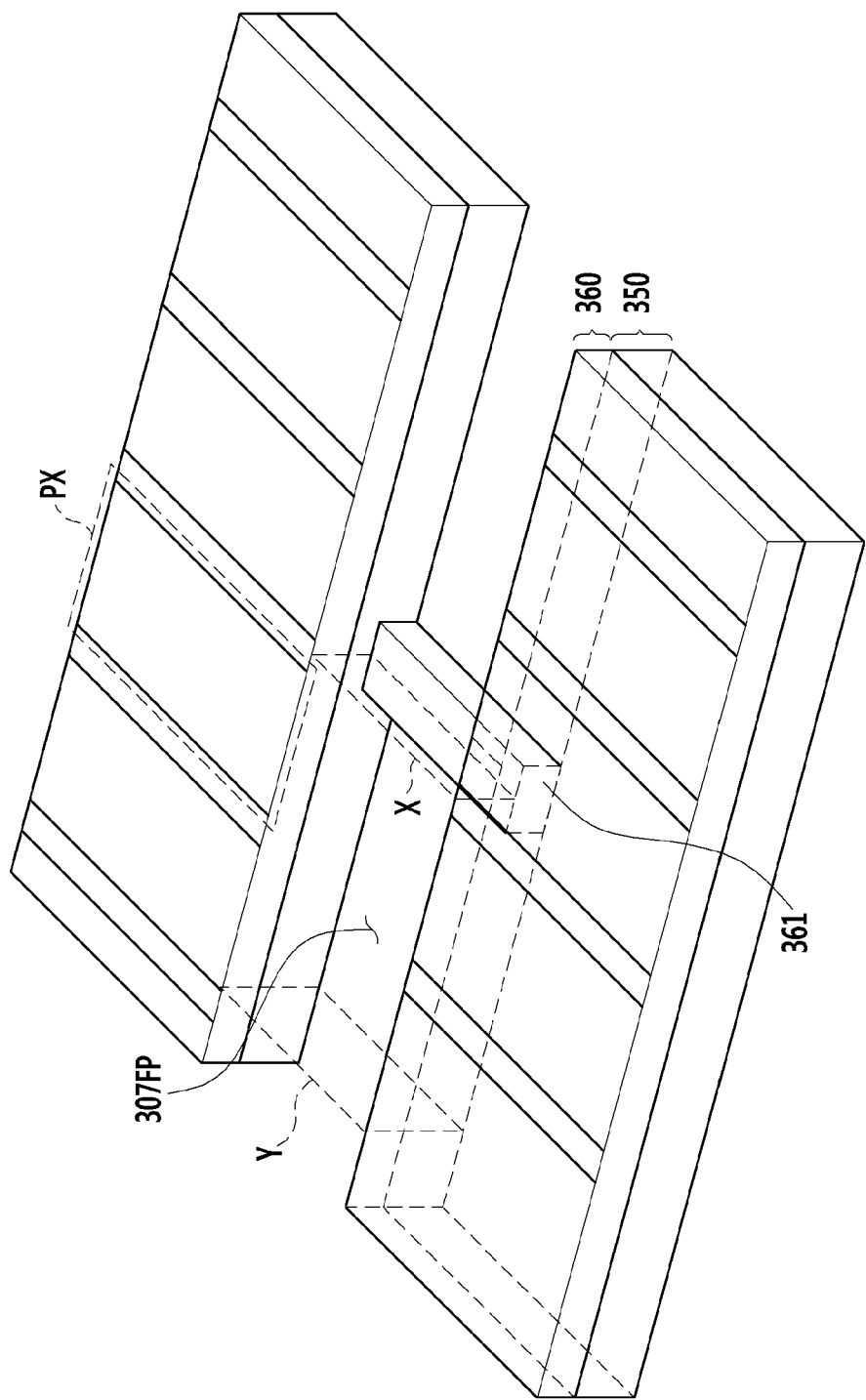
FIG. 9 is a perspective view of a bridge according to an embodiment in FIG. 8.
Figure 10:
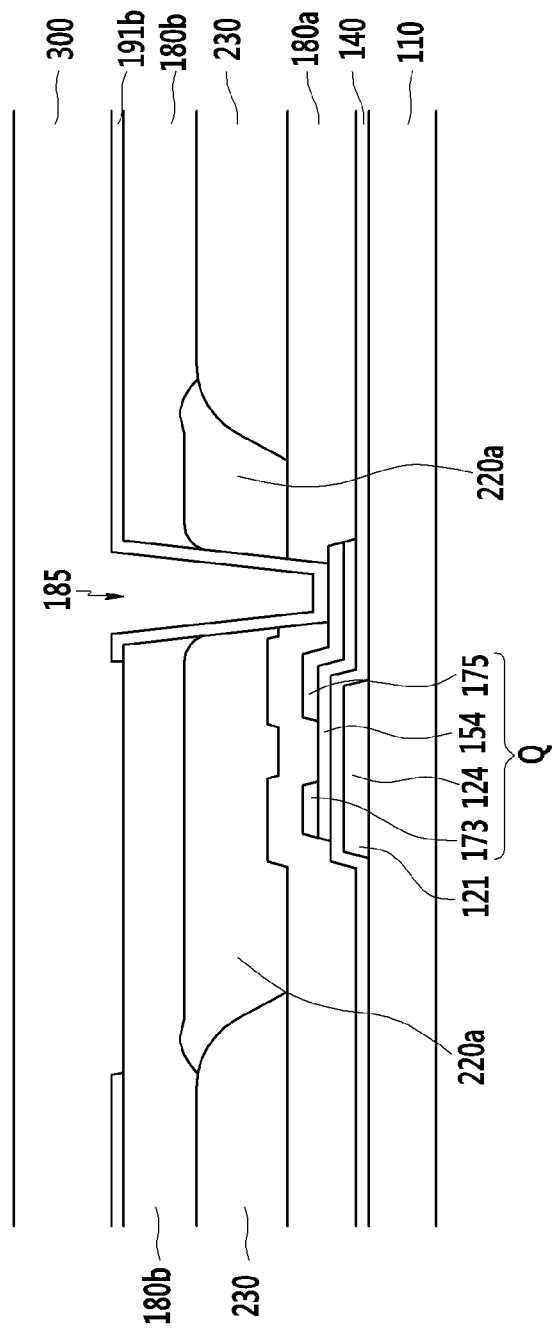
FIG. 10 to FIG. 22 are cross-sectional views to explain a manufacturing method of a liquid crystal display according to an embodiment.

FIG. 8 is a cross-sectional view of a liquid crystal display according to a variation of the embodiment of FIG. 5 taken along the line V-V of FIG. 4. FIG. 9 is a perspective view of a bridge according to an embodiment in FIG. 8.

The embodiment of FIG. 8 and FIG. 9 is mostly the same as the embodiment of FIG. 5 and FIG. 6, except for the formation position of the bridge. Referring to FIG. 8 and FIG. 9, the bridge 361 is disposed at substantially a same layer as the microcavity 305. In one embodiment, the bridge 361 is formed by a convex part formed by a step of the second interlayer insulating layer 180b. The step of the second interlayer insulating layer 180b may be formed by a step of the underlying first light blocking member 220a.

Referring to FIG. 9, the first region X of the trench 307FP corresponding to the portion where the bridge 361 is disposed has a first cross-section, and the second region Y of the trench 307FP except for the first region X has a second cross-section. The first cross-section is smaller than the second cross-section.

In one embodiment, the upper end of the bridge 361 may be filled by the capping layer 390. Except for this difference, the complete description of the embodiment of FIG. 5 and FIG. 6 may be applied to the present embodiment.

Next, an embodiment of manufacturing the liquid crystal display will be described with reference to FIG. 10 to FIG. 22.

Figure 11:
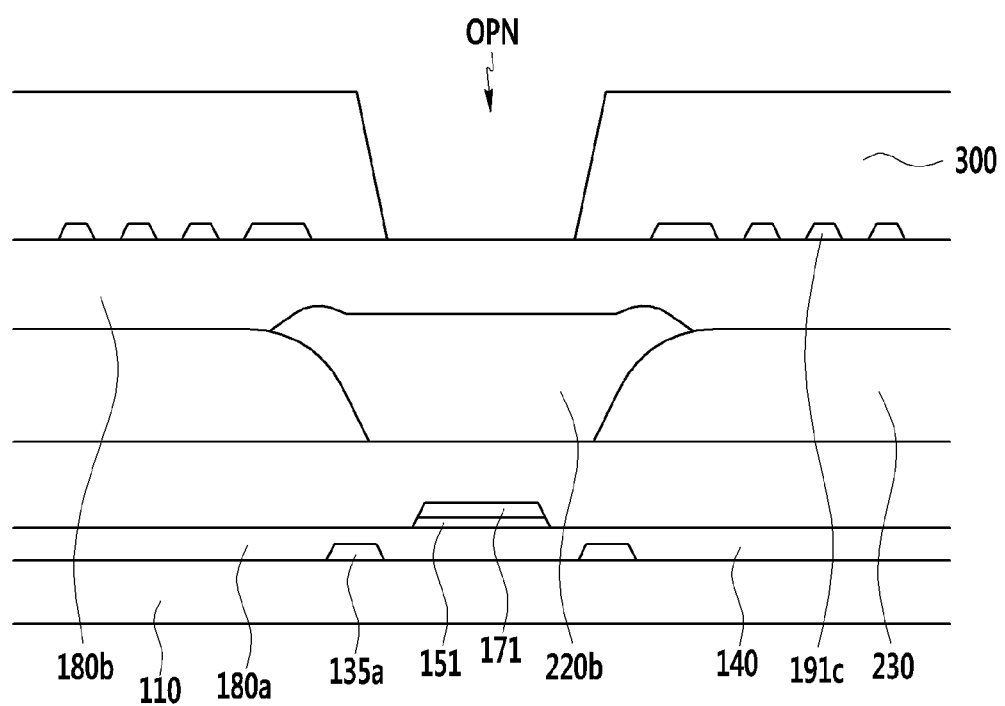
Figure 12:
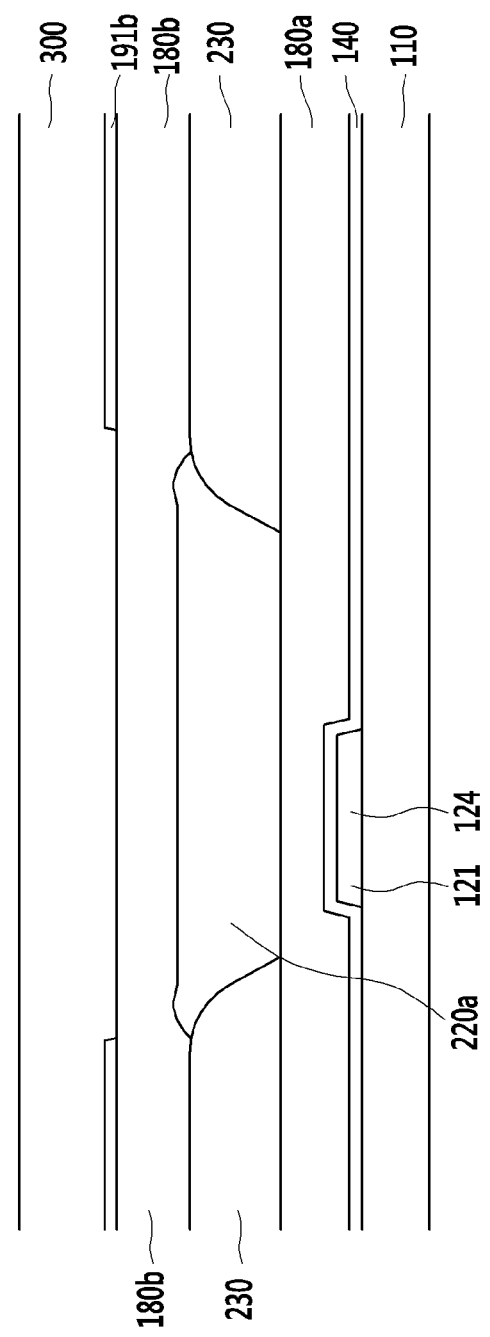

FIG. 10 to FIG. 22 are cross-sectional views to explain a manufacturing method of a liquid crystal display according to an embodiment. FIGS. 10, 13, 15, 17, 18, and 21 sequentially show the cross-sectional view taken along the line II-II of FIG. 1. FIGS. 11 and 19 sequentially show the cross-sectional view taken along the line of FIG. 1. FIGS. 12, 14, 16, 20, and 22 sequentially show the cross-sectional view taken along the line V-V of FIG. 4.

Referring to FIG. 1 and FIG. 10 to FIG. 12, to form a switching element on a substrate 110, a gate line 121 extending in the horizontal direction, a gate insulating layer 140 on the gate line 121, semiconductor layers 151 and 154 on the gate insulating layer 140, and a source electrode 173 and a drain electrode 175 are formed. A data line 171 connected to the source electrode 173 may be formed to be extended in the longitudinal direction while intersecting the gate line 121.

A first interlayer insulating layer 180a is formed on the data conductor including the source electrode 173, the drain electrode 175, and the data line 171, and on the exposed semiconductor layer 154.

A color filter 230 is formed on the first interlayer insulating layer 180a at a position corresponding to the pixel area, and a light blocking member 220 is formed between the color filters 230.

A second interlayer insulating layer 180b is formed on the color filter 230 and the light blocking member 220 while covering the color filter 230 and the light blocking member 220, and the second interlayer insulating layer 180b has a contact hole 185 to electrically and physically connect the pixel electrode 191 and the drain electrode 175.

Next, a pixel electrode 191 is formed on the second interlayer insulating layer 180b, and a sacrificial layer 300 is formed on the pixel electrode 191. As shown in FIG. 11, an open part (OPN) is formed in the sacrificial layer 300 according to the direction parallel to the data line 171. The common electrode 270, the lower insulating layer 350, the roof layer 360, and the upper insulating layer 370 are filled in the open part (OPN), thereby forming the partition forming portion (PWP).

Figure 13:
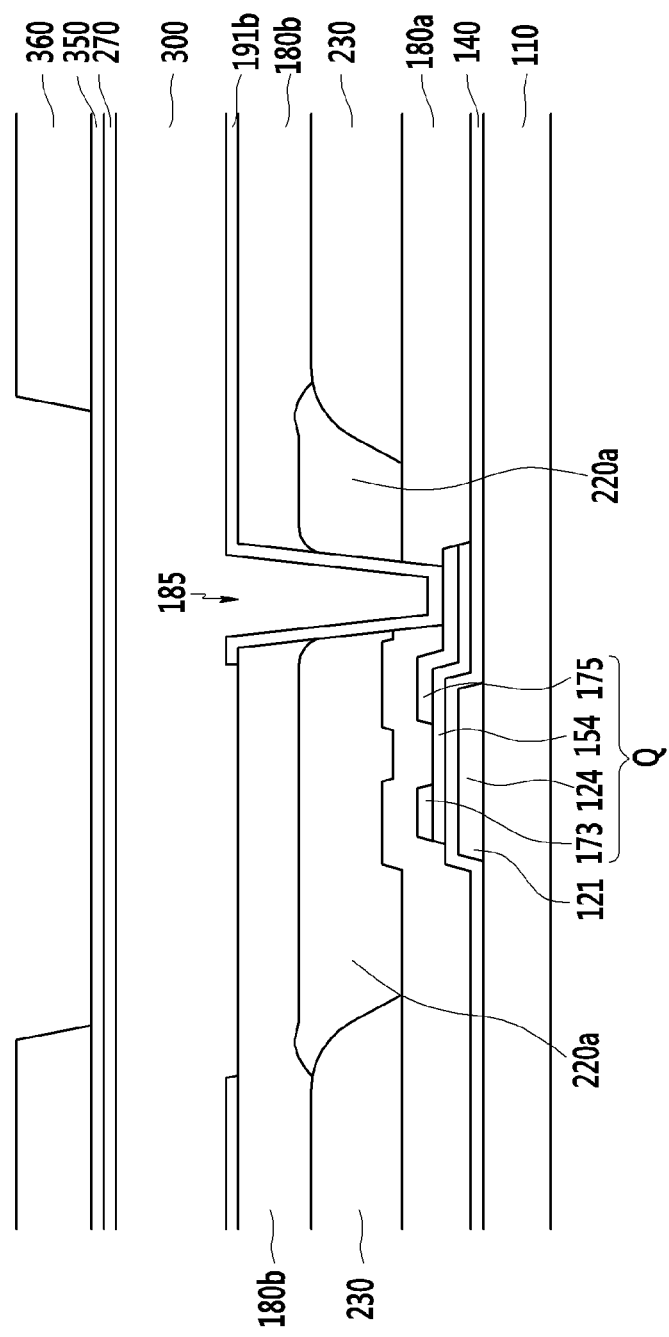
Figure 14:
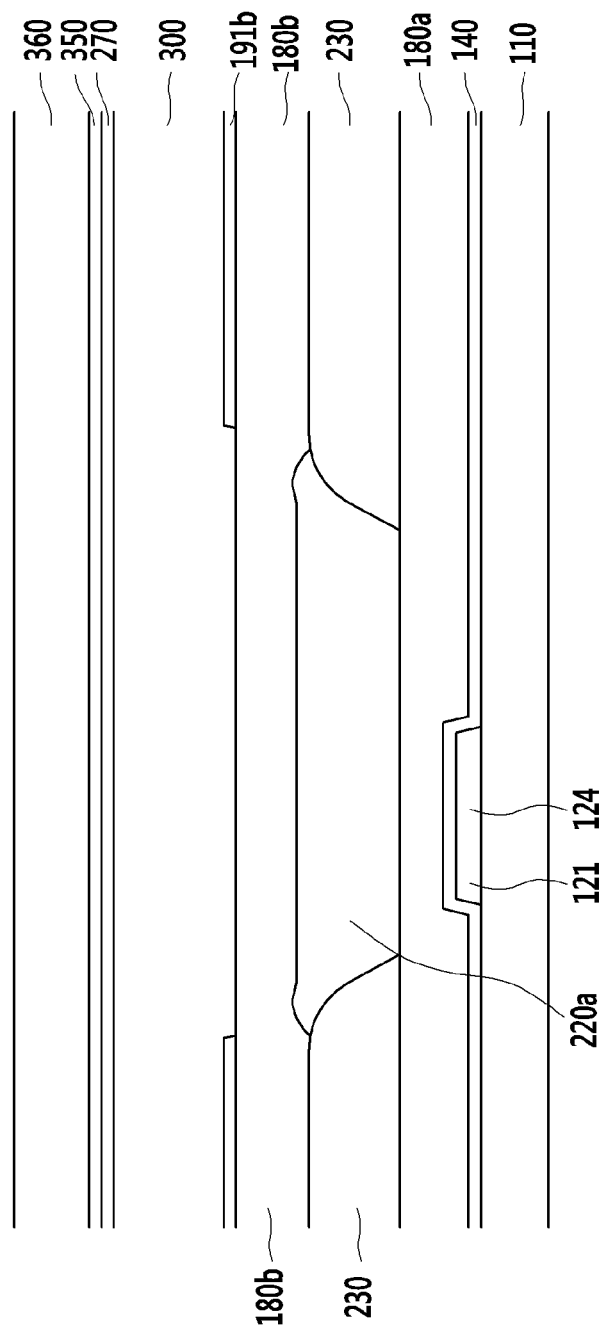

Referring to FIG. 13 and FIG. 14, the common electrode 270, the lower insulating layer 350, and the roof layer 360 are sequentially formed on the sacrificial layer 300. The roof layer 360 is located between pixel areas neighboring in a vertical direction by exposure and development processes, and may be removed from an area corresponding to the light blocking member 220. The roof layer 360 exposes the lower insulating layer 350 to the outside in the area corresponding to the light blocking member 220. In one embodiment, the portion of the roof layer 360 corresponding to the portion where the bridge 361 is formed is not removed but is maintained. When removing the roof layer 360 in the region corresponding to the first light blocking member 220a by the exposure and developing process, a method using a blocking mask covering the portion where the bridge 361 is formed may be applied.

Figure 15:
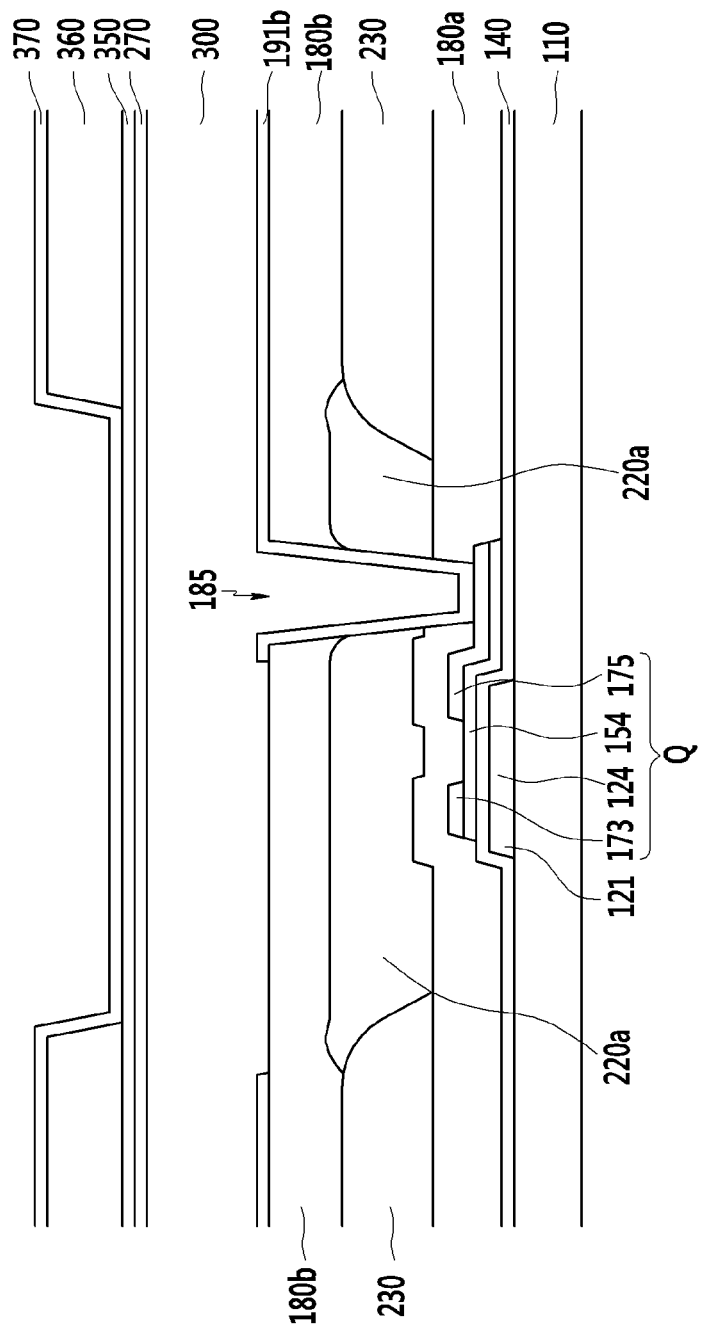
Figure 16:
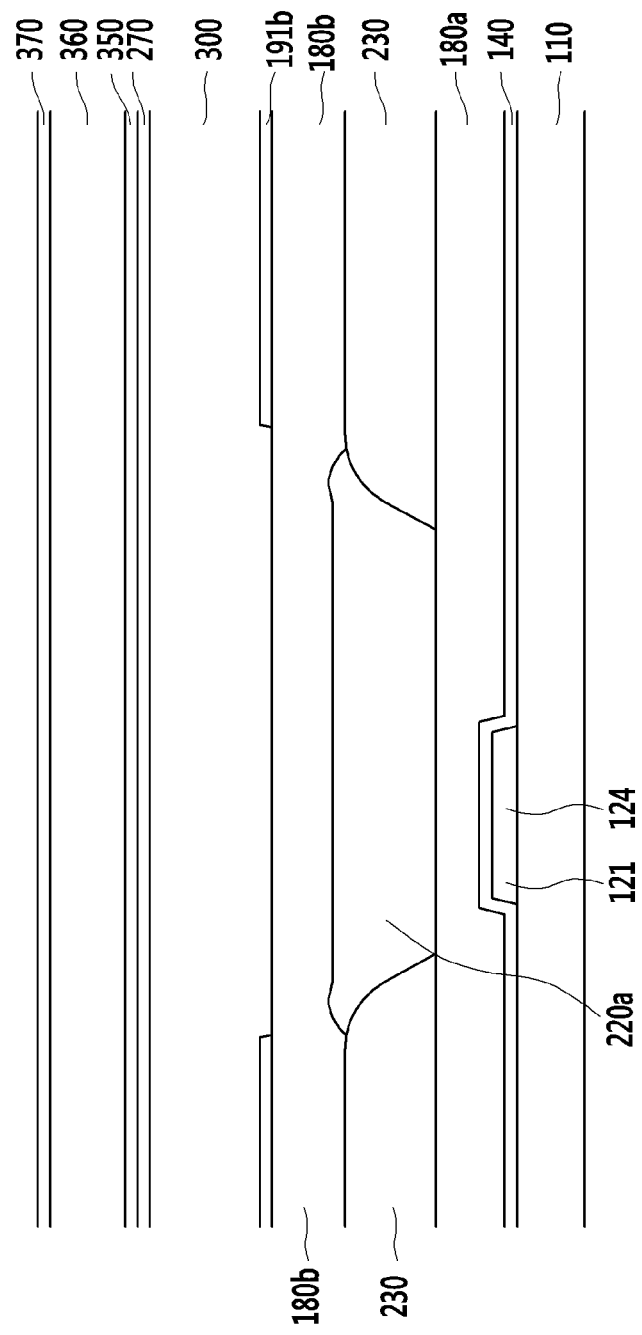

Referring to FIG. 15 and FIG. 16, the upper insulating layer 370 covering the roof layer 360 and the exposed lower insulating layer 350 is formed.

Figure 17:
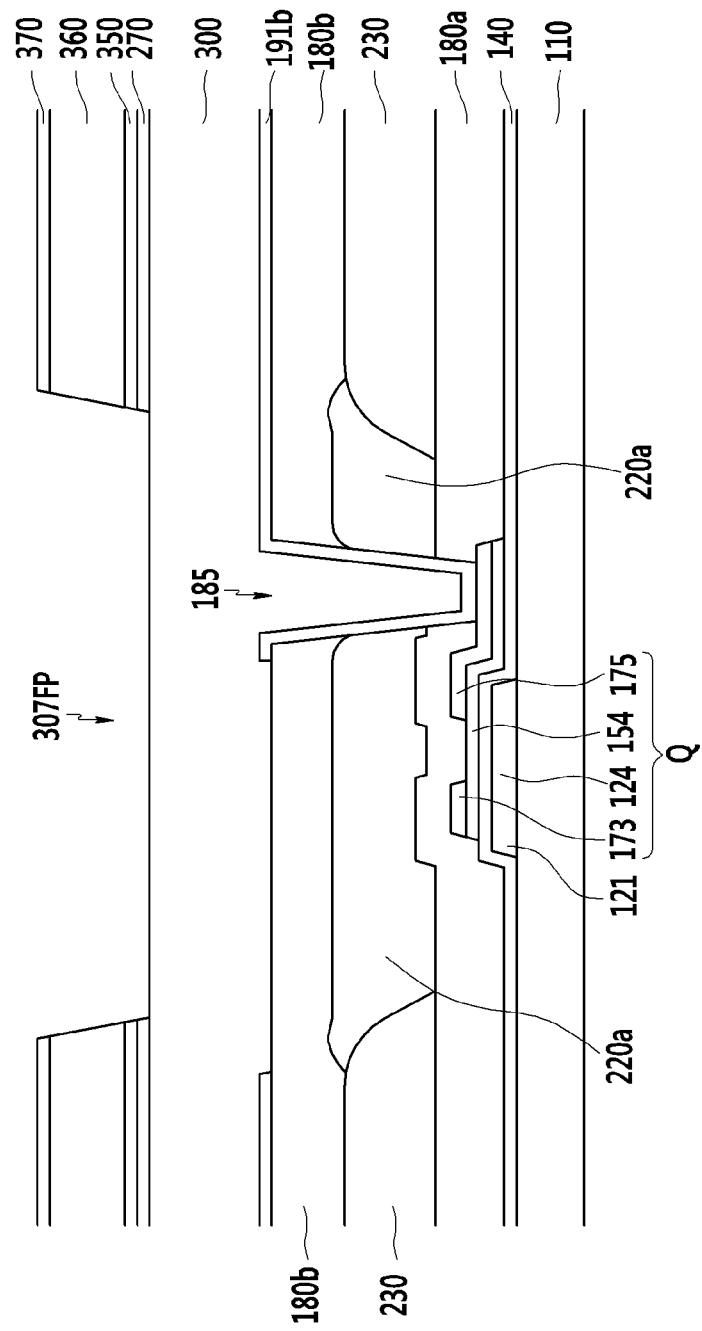

Referring to FIG. 17, the upper insulating layer 370, the lower insulating layer 350, and the common electrode 270 are dry etched by using an etching mask. In FIG. 17, each side of the upper insulating layer 370, the roof layer 360, the lower insulating layer 350, and the common electrode 270 are shown to be disposed on the same line, however the upper insulating layer 370 may cover the side of the roof layer 360 by controlling a boundary of the etching mask.

The trench 307FP is formed by partially removing the upper insulating layer 370, the lower insulating layer 350, and the common electrode 270. As shown in FIG. 17, the sacrificial layer 300 is exposed.

Figure 18:
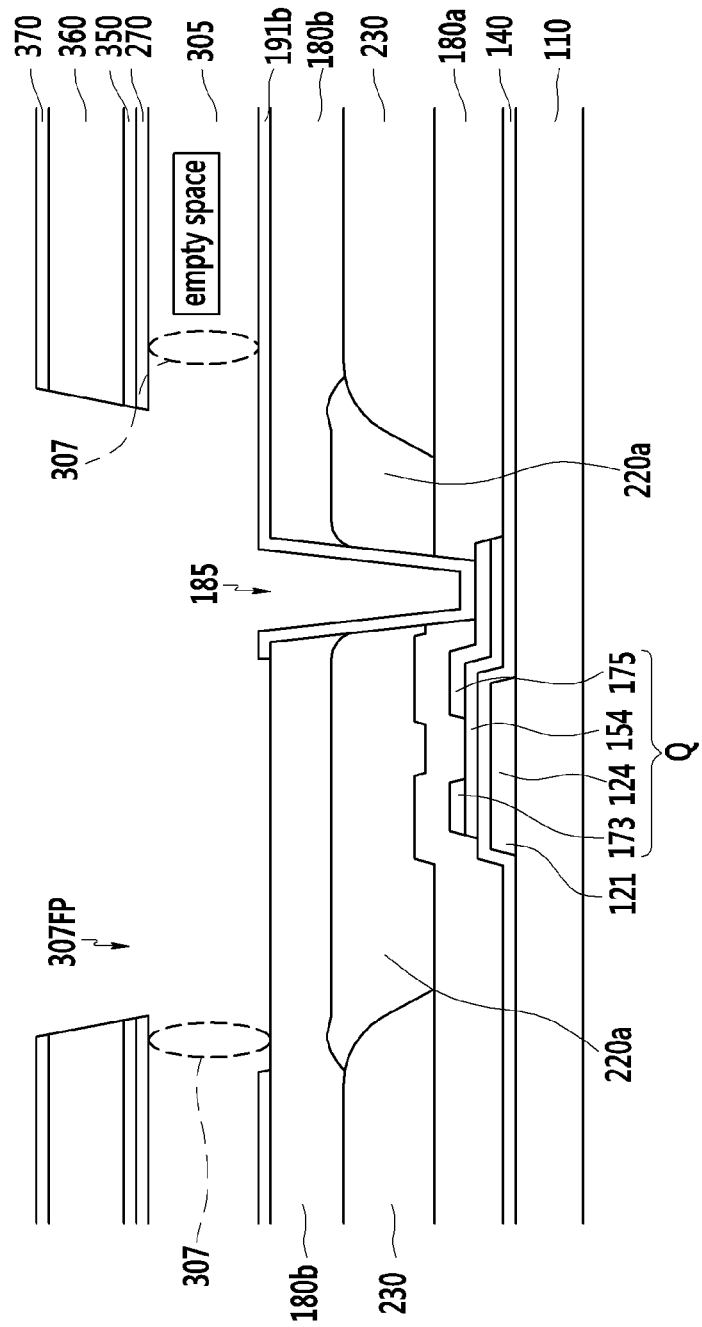
Figure 19:
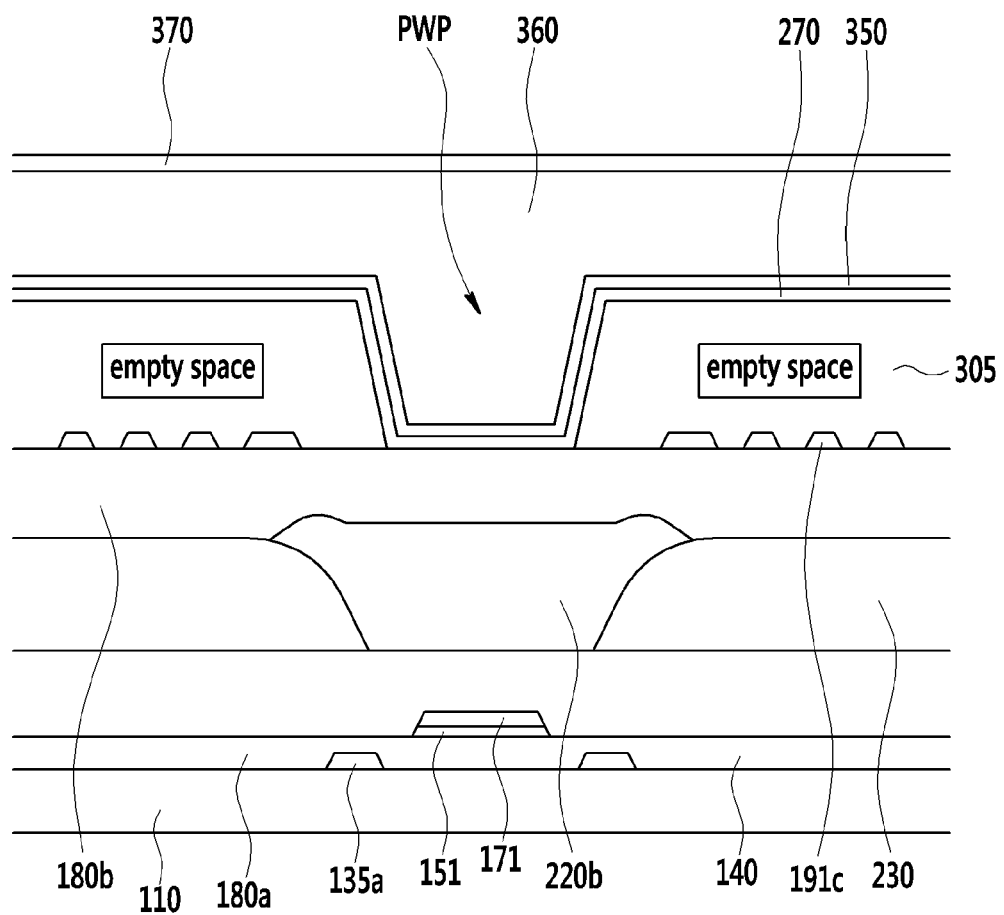
Figure 20:
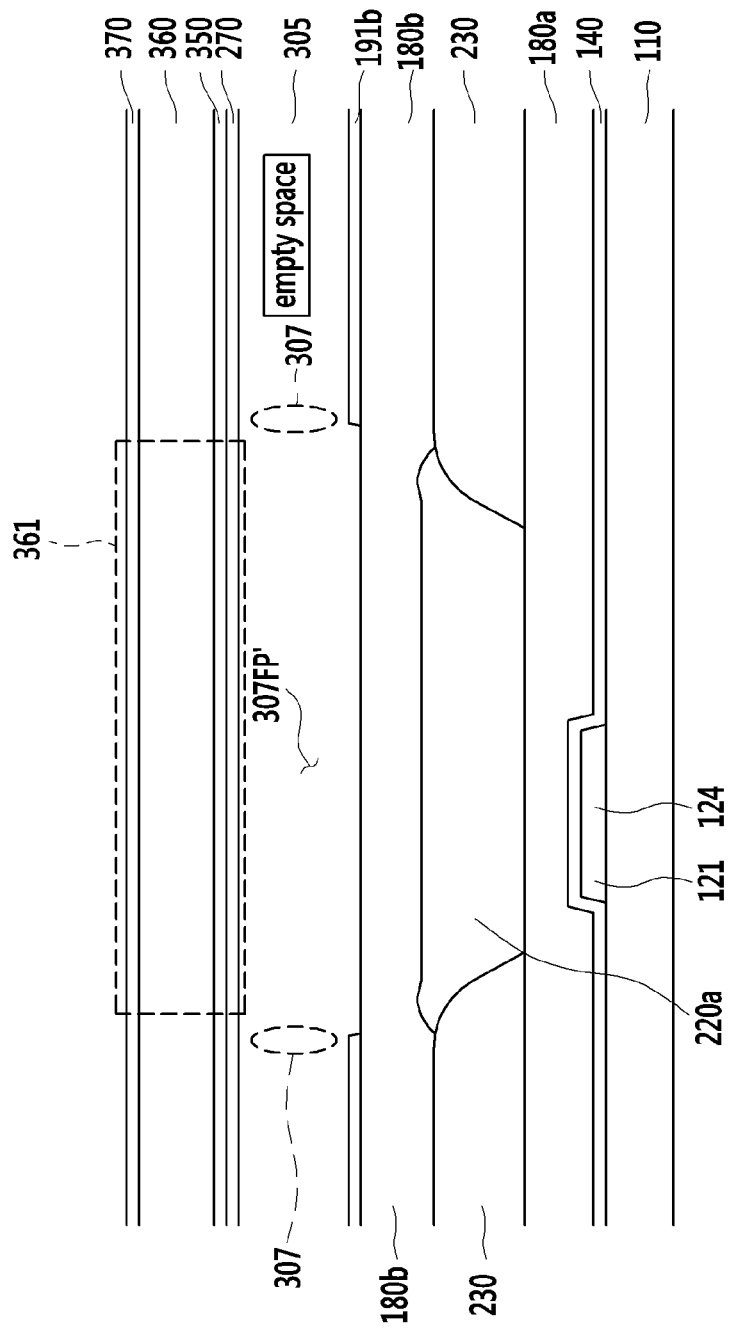

Referring to FIG. 18 to FIG. 20, the sacrificial layer 300 exposed through the trench 307FP is removed by an $O_2$ ashing process or a wet etching method. The microcavity 305 having the liquid crystal injection hole 307 is formed. The microcavity 305 is in a state of an empty space according to the removal of the sacrificial layer 300. As shown in FIG. 20, the bridge 361 is formed and the sacrificial layer 300 is removed under the bridge 361 such that the trench 307FP' having a relatively smaller cross-section is formed.

Figure 21:
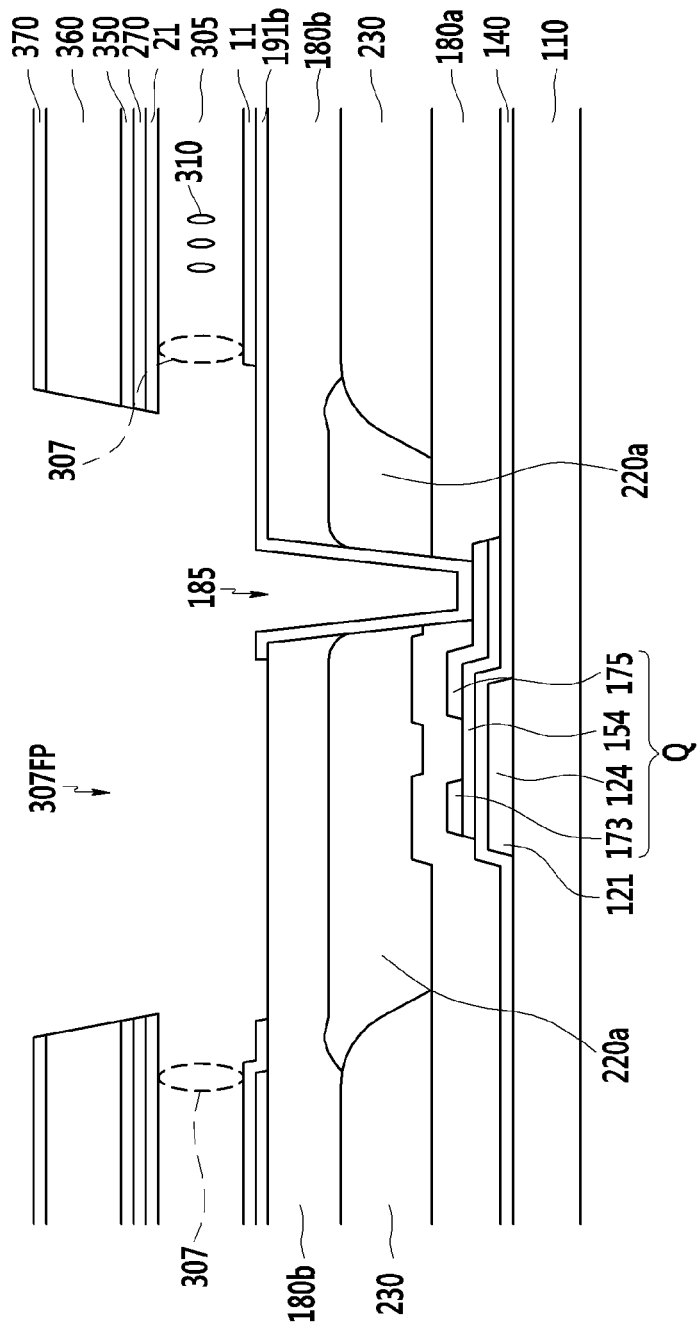
Figure 22:
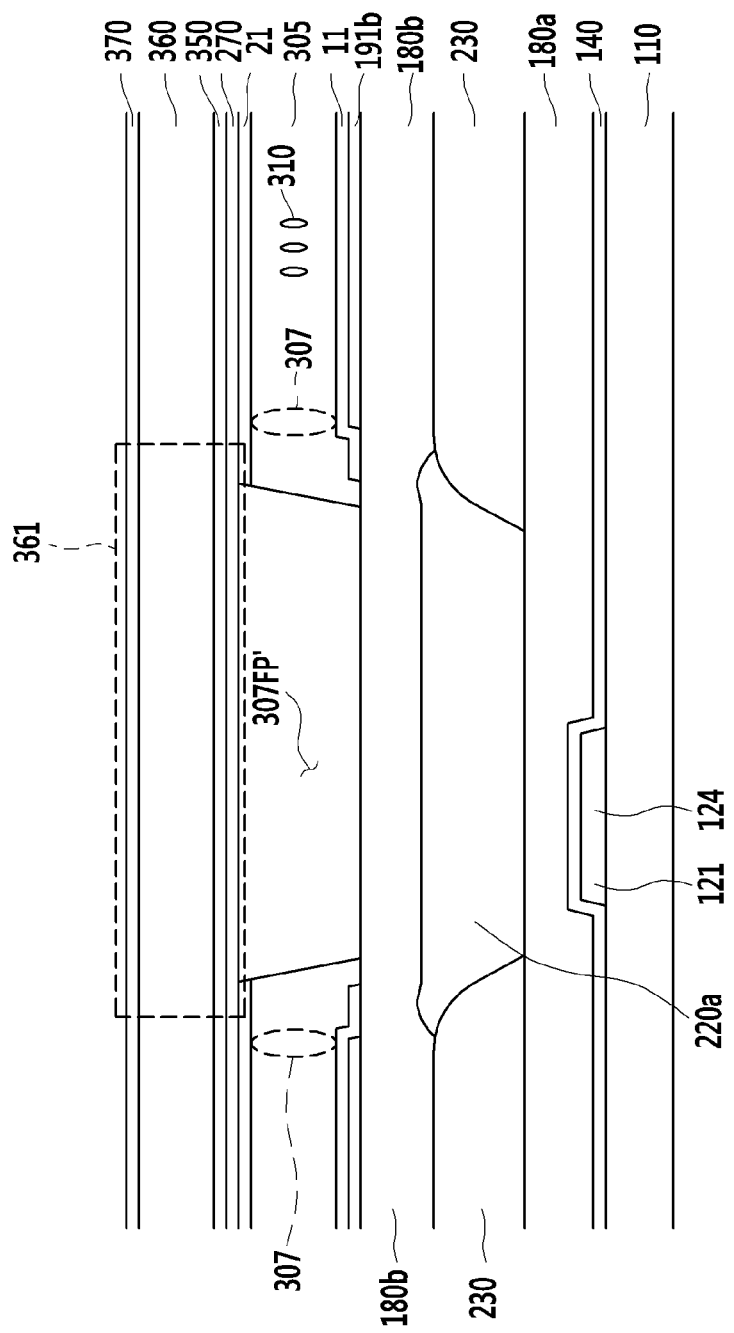

Referring to FIG. 21 and FIG. 22, an alignment material is injected through the liquid crystal injection hole 307 to form the alignment layers 11 and 21 on the pixel electrode 191 and the common electrode 270. A bake process is performed after the alignment material including solids and a solvent is injected through the liquid crystal injection hole 307. The solids are accumulated to the portion of the trench 307FP' having the relatively smaller cross-section and disposed under the bridge 361, thereby having a function of supporting the bridge 361.

Next, a liquid crystal material including the liquid crystal molecules 310 is injected into the microcavity 305 through the liquid crystal injection hole 307 by using an inkjet method and the like. At this time, by an influence of a surface tension and a capillary force according to the bridge 361 according to an embodiment, in one trench 307FP, the liquid crystals may be prevented from being concentrated or disconnected in the space between the microcavity 305 disposed at the upper end and the microcavity 305 disposed at the lower end.

Next, the capping layer 390 covering the liquid crystal injection hole 307 and filling the trench 307FP is formed on the upper insulating layer 370, thereby forming the liquid crystal display shown in FIG. 1 to FIG. 5.

The capping layer 390 may be formed by pushing a capping material from one side edge to the other side edge on the substrate 110 by using a bar coater, and simultaneously hardening it by using ultraviolet rays. At this time, the capping material goes into the trench 307FP' having the relatively large cross-section under the bridge 361 such that the liquid crystal material remaining on the roof layer 360 by overflow of the liquid crystal material and then consequent light leakage being generated may be prevented.

FIG. 23 to FIG. 28 are cross-sectional views to illustrate a manufacturing method of a liquid crystal display according to an embodiment.

The embodiment described with reference to FIG. 23 to FIG. 28 is almost the same as the embodiment described with reference to FIG. 10 to FIG. 22. However, the formation position of the bridge 361 is different, and this difference will be mainly described.

Figure 23:
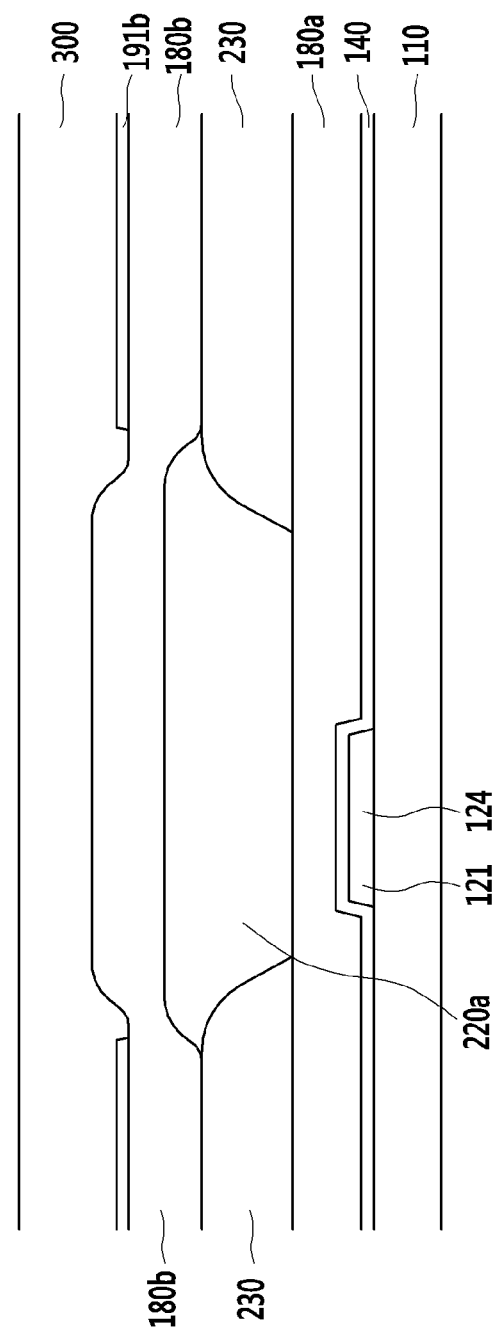
FIG. 23 to FIG. 28 are cross-sectional views to explain a manufacturing method of a liquid crystal display according to an embodiment.

Referring to FIG. 23, the first light blocking member 220a is formed to partially have a step and the second interlayer insulating layer 180b is formed thereon. The second interlayer insulating layer 180b has a convex part caused by the step of the first light blocking member 220a. The sacrificial layer 300 is formed on the pixel electrode 191b and the convex part of the second interlayer insulating layer 180b.

Figure 24:
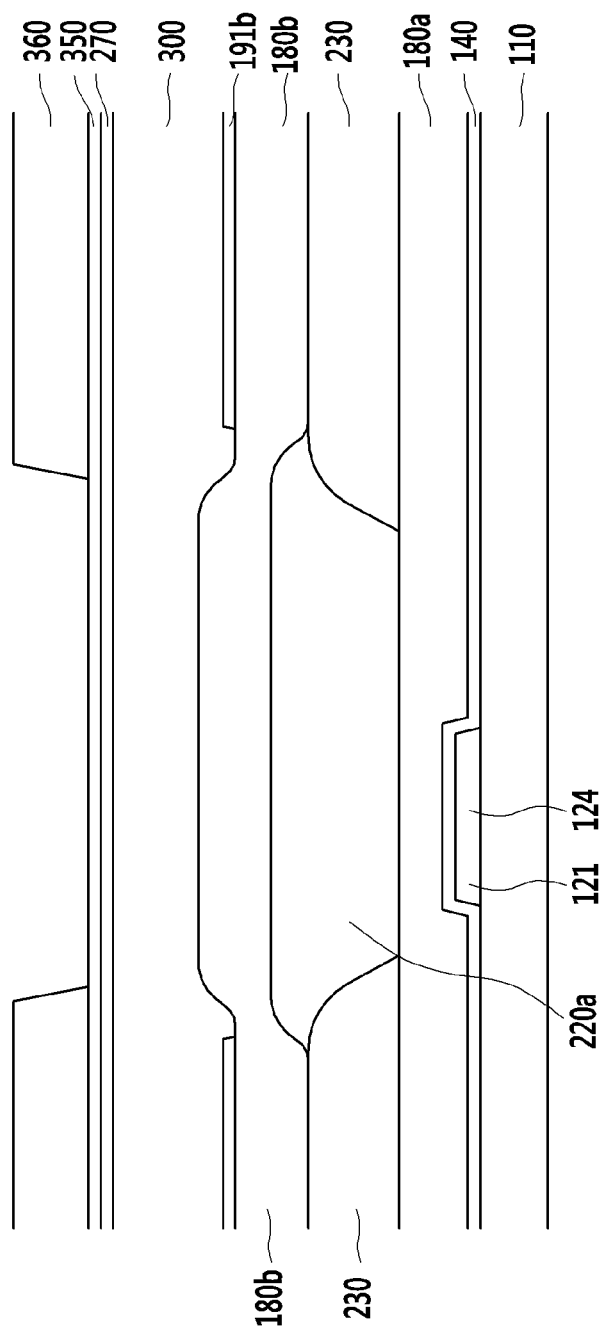

Referring to FIG. 24, the common electrode 270, the lower insulating layer 350, and the roof layer 360 are sequentially formed on the sacrificial layer 300. The roof layer 360 may be removed in the region corresponding to the first light blocking member 220a disposed between the pixel areas adjacent in the vertical direction by an exposure and development process. The roof layer 360 exposes the lower insulating layer 350 in the region corresponding to the first light blocking member 220a.

Figure 25:
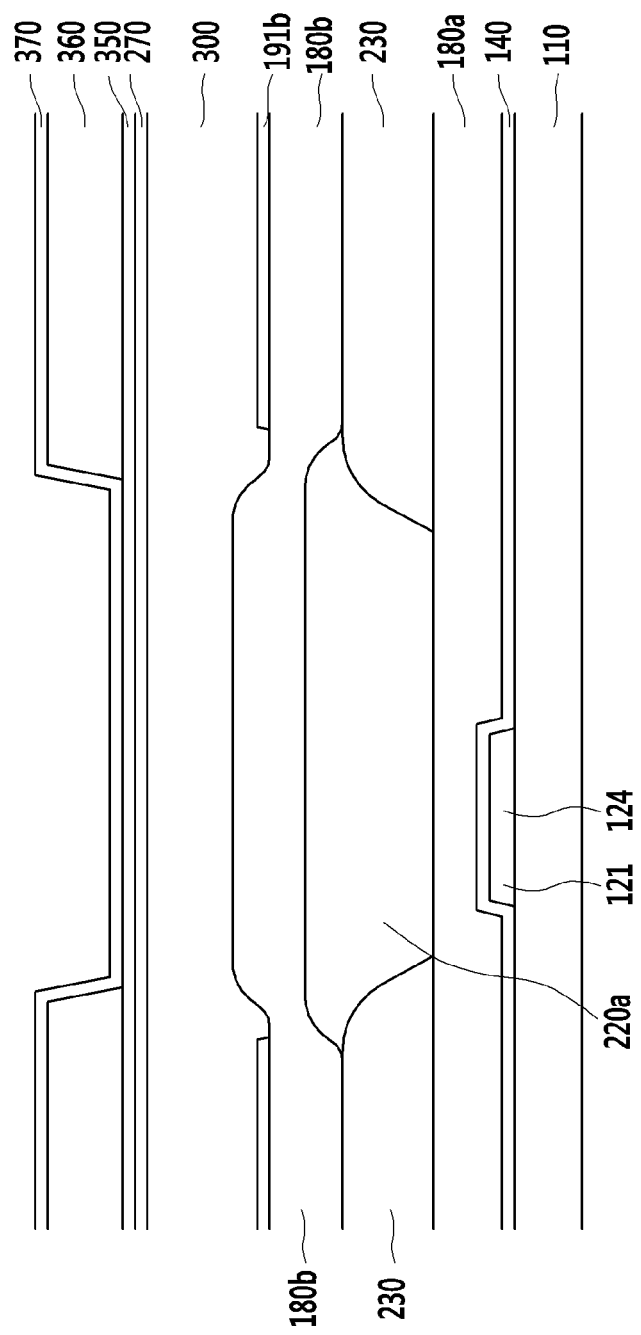

Referring to FIG. 25, the upper insulating layer 370 covering the roof layer 360 and the exposed lower insulating layer 350 is formed.

Figure 26:
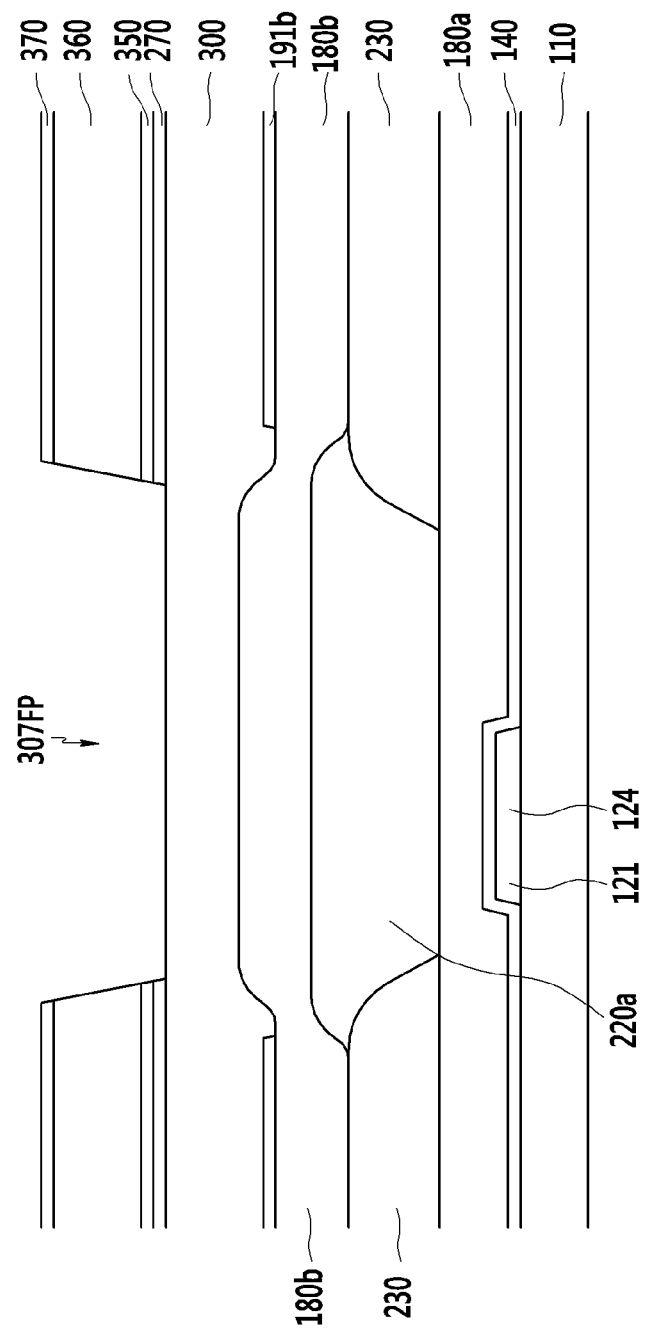

Referring to FIG. 26, the upper insulating layer 370, the lower insulating layer 350, and the common electrode 270 are dry etched by using an etching mask. The trench 307FP is formed by partially removing the upper insulating layer 370, the lower insulating layer 350, and the common electrode 270. At this time, as shown in FIG. 26, the sacrificial layer 300 exposed.

Figure 27:
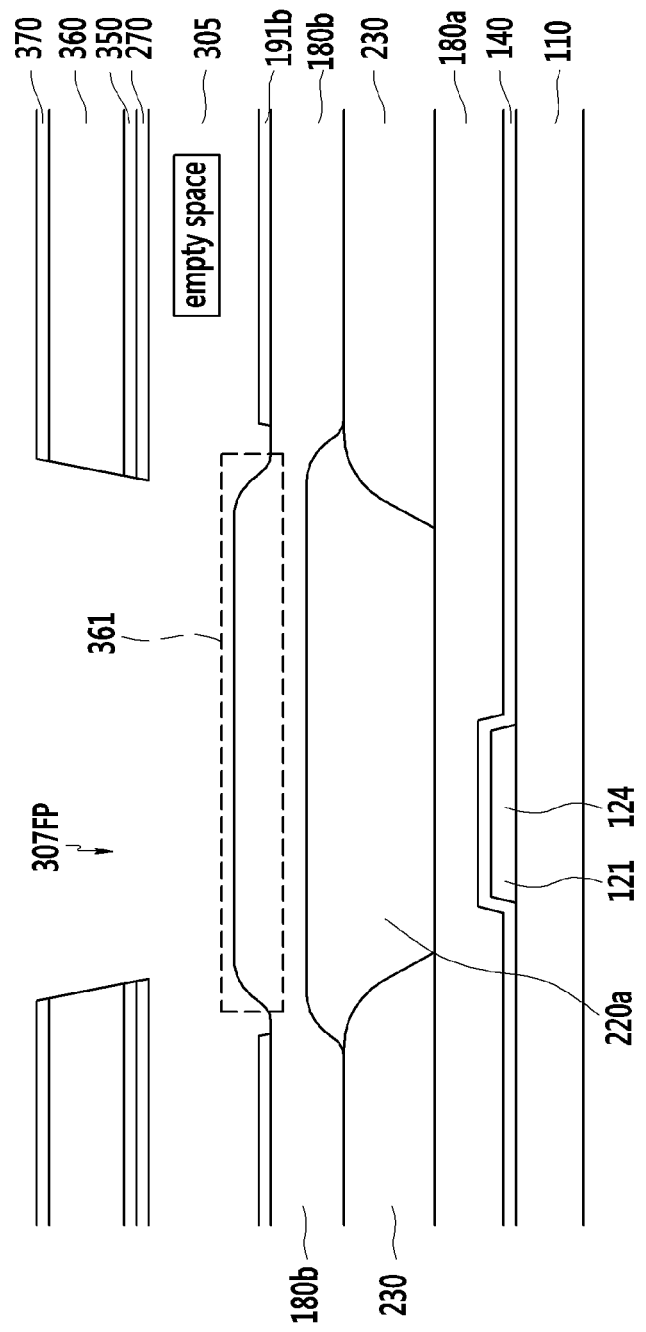

Referring to FIG. 27, the sacrificial layer 300 exposed through the trench 307FP is removed by an $O_2$ ashing process or a wet etching method. The sacrificial layer 300 is removed and the microcavity 305 of the empty state is formed. As shown in FIG. 27, the bridge 361 is formed and the convex part of the second interlayer insulating layer 180b resultantly remains as the bridge 361. However, the method of forming the second interlayer insulating layer 180b as the bridge 361 is not limited, and a separate structure may be formed on the second interlayer insulating layer 180b to form the bridge 361.

Figure 28:
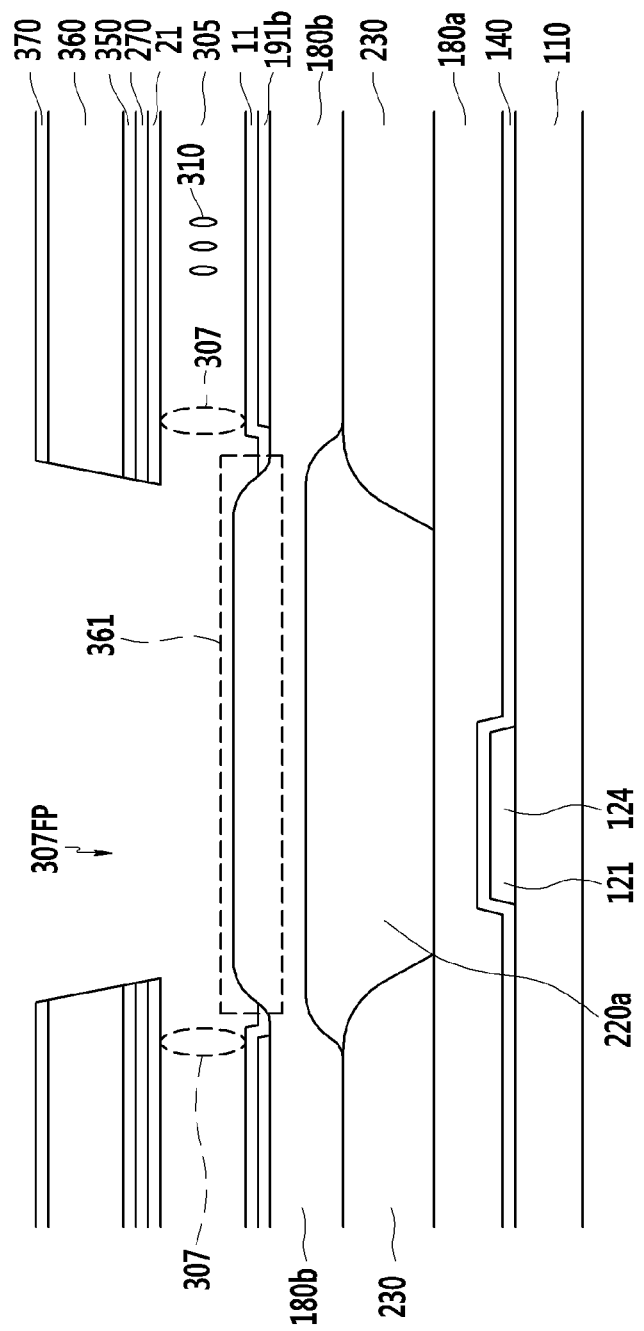

Referring to FIG. 28, an alignment material is injected through the liquid crystal injection hole 307 to form the alignment layers 11 and 21 on the pixel electrode 191 and the common electrode 270. The bake process is performed after the alignment material including solids and a solvent is injected through the liquid crystal injection hole 307.

Next, the liquid crystal material including the liquid crystal molecules 310 is injected into the microcavity 305 through the liquid crystal injection hole 307 by using an inkjet method and the like. By an influence of a surface tension and a capillary force according to the bridge 361 according to one embodiment, in one trench 307FP, the liquid crystal may be prevented from being concentrated or disconnected in the space between the microcavity 305 disposed at the upper end and the microcavity 305 disposed at the lower end. Also, the bridge 361 according to one embodiment forms a threshold such that the liquid crystal material in the trench 370FP is not over a predetermined amount thereby controlling speed of liquid crystal injection.

Next, the capping layer 390 covering the liquid crystal injection hole 307 and filling the trench 307FP is formed on the upper insulating layer 370, thereby forming the liquid crystal display shown in FIG. 8.

Except for the described difference, the complete description of the embodiment of FIG. 10 to FIG. 22 may be applied to the present embodiment.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:

a substrate;

a thin film transistor comprising one or more terminals and disposed on the substrate;

a pixel electrode connected to one of the terminals of the thin film transistor;

a roof layer disposed to face the pixel electrode;

a liquid crystal layer comprising liquid crystal molecules disposed in a plurality of microcavities between the pixel electrode and the roof layer;

a lower insulating layer disposed between the roof layer and the liquid crystal layer; and a capping layer disposed on the roof layer;

wherein the plurality of microcavities are disposed along a first row and a second row adjacent to each other, a trench is disposed between the first row and the second row, and at least one bridge connecting the first row and the second row is disposed at the trench, and wherein the at least one bridge is disposed at a same layer as one of the roof layer or the lower insulating layer, and wherein the capping layer is disposed in both the lower surface and the upper surface of the bridge.

2. The liquid crystal display of claim 1, wherein the trench includes a first region having a first cross-section and a second region having a second cross-section, the first cross-section being smaller than the second cross-section, and the first region corresponding to a portion in which the at least one bridge is disposed.

3. The liquid crystal display of claim 1, wherein the at least one bridge comprises a same material as the roof layer.

4. The liquid crystal display of claim 3, further comprising a common electrode disposed between the plurality of microcavities and the roof layer, the lower insulating layer being disposed on the common electrode, and the common electrode and the lower insulating layer extending to be disposed under the bridge.

5. The liquid crystal display of claim 4, wherein the capping layer fills the trench.

6. The liquid crystal display of claim 5, further comprising a light blocking member disposed on the substrate, the light blocking member including a first light blocking member extending in the same direction as a gate line connected to the thin film transistor, and a second light blocking member extending in the same direction as a data line connected to the thin film transistor, wherein the at least one bridge extends in the same direction as the second light blocking member and overlaps the second light blocking member.

7. The liquid crystal display of claim 2, wherein the at least one bridge comprises a same material as the lower insulating layer.

8. The liquid crystal display of claim 7, further comprising an insulating layer disposed between the thin film transistor and the pixel electrode, the insulating layer including a convex part, wherein the convex part forms the at least one bridge.

9. The liquid crystal display of claim 8, further comprising a common electrode disposed between the plurality of microcavities and the roof layer, wherein the lower insulating layer is disposed on the common electrode.

10. The liquid crystal display of claim 9, wherein the capping layer fills the trench.

11. A method of manufacturing the liquid crystal display of claim 1, comprising:

forming the thin film transistor comprising the one or more terminals on the substrate;

forming the pixel electrode connected to one of the terminals of the thin film transistor;

forming a sacrificial layer on the pixel electrode;

forming the roof layer on the sacrificial layer;

patterning a lower insulating layer and a common electrode by using the roof layer as a mask;

patterning the roof layer to form the trench;

removing the sacrificial layer to form the plurality of microcavities having a liquid crystal injection hole;

injecting the liquid crystal material into the plurality of microcavities; and forming a capping layer covering the liquid crystal injection hole on the roof layer, wherein the plurality of microcavities is disposed along the first row and the second row adjacent to each other, wherein the trench is formed between the first row and the second row, and wherein the at least one bridge connecting the first row and the second row is disposed at the trench.

12. The method of claim 11, wherein the trench includes a first region having a first cross-section and a second region having a second cross-section, wherein the first cross-section is smaller than the second cross-section, and wherein the first region corresponds to a portion in which the at least one bridge is disposed.

13. The method of claim 12, wherein, in the patterning of the roof layer, the roof layer is configured to remain in a portion in which the at least one bridge is formed.

14. The method of claim 13, wherein the at least one bridge comprises a same material as the roof layer.

15. The method of claim 14, further comprising injecting an alignment material into the plurality of microcavities, drying the alignment material, wherein a solid remains after the alignment material is dried and formed under the at least one bridge.

16. The method of claim 15, further comprising forming a light blocking member on the substrate, the light blocking member including a first light blocking member extending in the same direction as a gate line connected to the thin film transistor, and a second light blocking member in the same direction as a data line connected to the thin film transistor, wherein the at least one bridge extends in the same direction as the second light blocking member while overlapping the second light blocking member.

17. The method of claim 12, further comprising forming an insulating layer between the thin film transistor and the pixel electrode, wherein the insulating layer includes a convex part, and the convex part forms the at least one bridge.

18. The method of claim 17, further comprising
forming a light blocking member on the substrate, wherein an upper surface of the light blocking member is protruded corresponding to a portion in which the at least one bridge is disposed.

19. The method of claim 18, further comprising forming a common electrode and a lower insulating layer disposed between the plurality of microcavities and the roof layer, wherein the lower insulating layer is formed to be disposed on the common electrode.

* * * * *